United States Patent
Ferrie

(10) Patent No.: US 7,664,626 B1
(45) Date of Patent: Feb. 16, 2010

(54) AMBIGUOUS-STATE SUPPORT IN VIRTUAL MACHINE EMULATORS

(75) Inventor: Peter Ferrie, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 688 days.

(21) Appl. No.: 11/389,629

(22) Filed: Mar. 24, 2006

(51) Int. Cl.
*G06F 9/455* (2006.01)
(52) U.S. Cl. .................................................. 703/23
(58) Field of Classification Search .................. 703/23; 726/22, 23, 24, 25
See application file for complete search history.

(56) References Cited

U.S. PATENT DOCUMENTS 7,260,725 B2 * 8/2007 Carmona et al. ............ 713/187

2007/0226711 A1 * 9/2007 Challener et al. ........... 717/141
2008/0209562 A1 * 8/2008 Szor ............................ 726/24

* cited by examiner

*Primary Examiner*—Paul L Rodriguez
*Assistant Examiner*—Andre Pierre Louis
(74) *Attorney, Agent, or Firm*—Gunnison, McKay & Hodgson, L.L.P.; Philip J. McKay

(57) ABSTRACT

A method and apparatus for ambiguous-state support in virtual machine emulators executes a suspect application in a core emulation model for all versions, variations, or generations of a given computer system component and then branches at the point where ambiguous behavior is detected, i.e., at the occurrence/request/trigger of a version variable behavior by the suspect application. The state of the emulation up to the version variable behavior branch point is then copied, and each variable behavior branch is further emulated using variable specific emulation models and only from the point of ambiguity, i.e., from the point of variable behavior, forward.

20 Claims, 5 Drawing Sheets

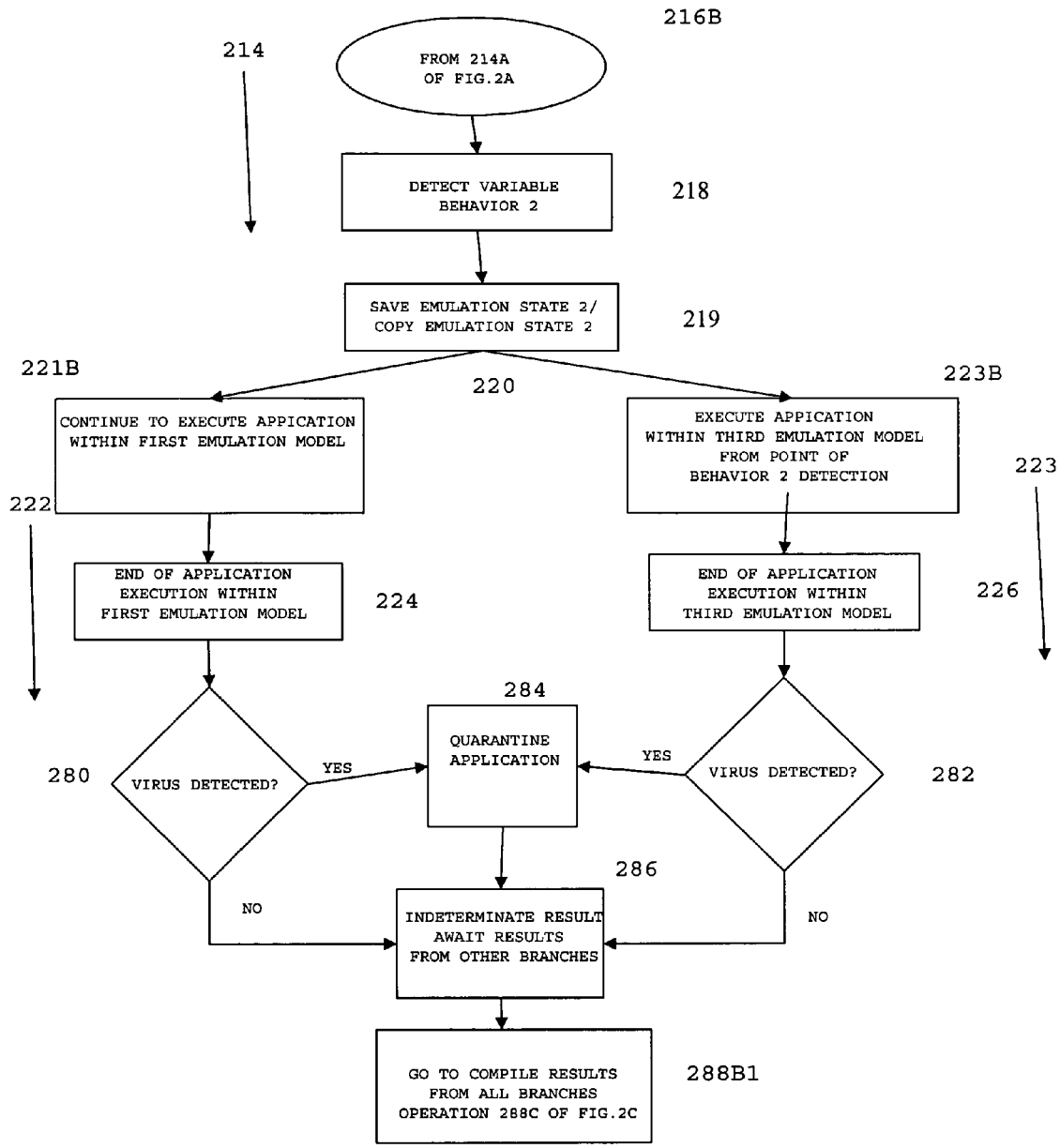
FIG.2B1

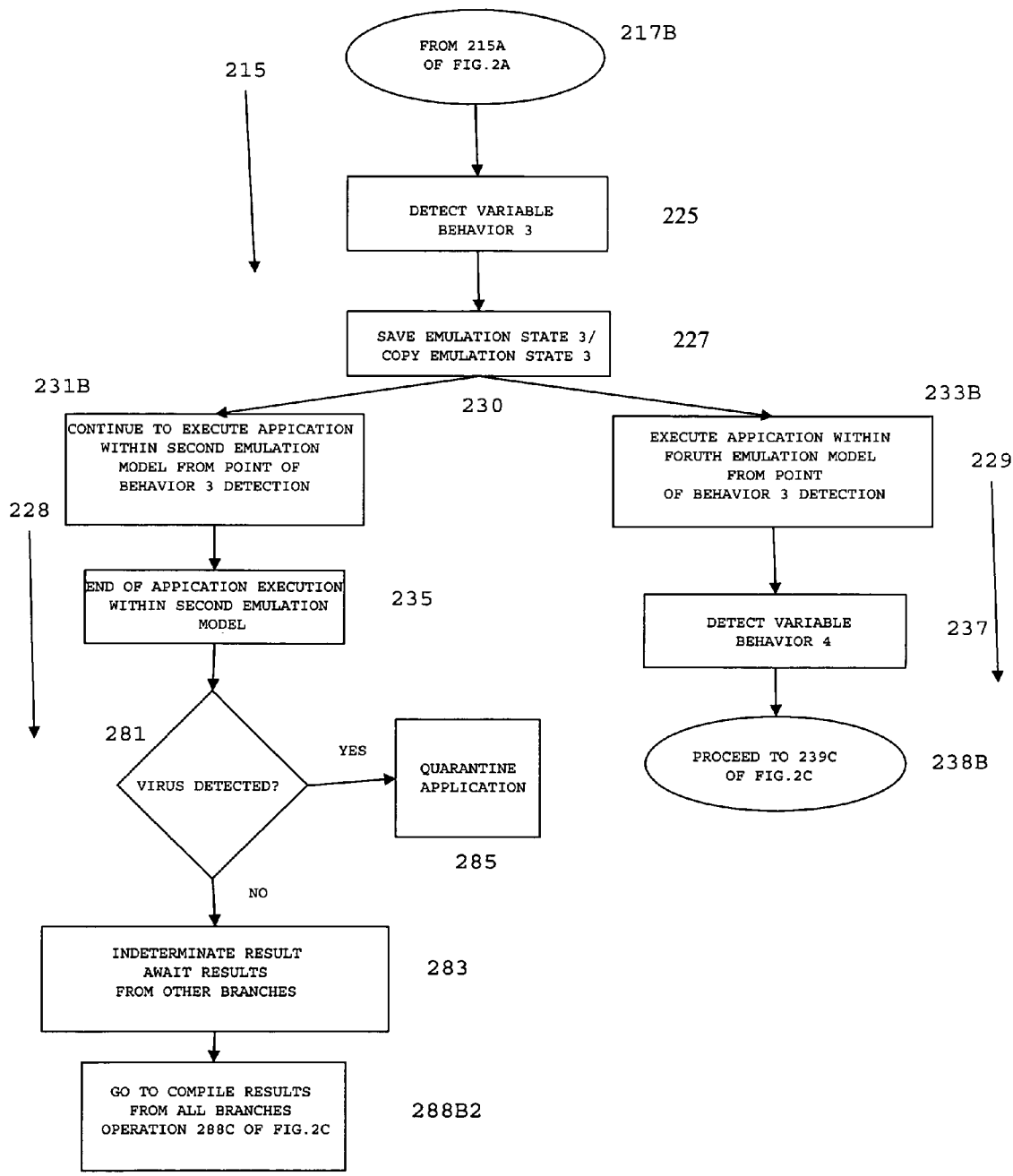
FIG.2B2

AMBIGUOUS-STATE SUPPORT IN VIRTUAL MACHINE EMULATORS

BACKGROUND OF THE INVENTION

The present invention relates to computer system security and virtual machine emulators.

Anti-virus systems and methods typically protect a computer system from viruses, also referred to herein as malevolent applications or malevolent code, by examining the computer's memory and file system for signs of virus infestation. This examination process is called scanning. Anti-virus programmers use two main scanning strategies, on demand and on access scanning. Using on-demand scanning, end-users activate a virus-scanning program each time they want to examine the computer for viruses. Using on-access virus scanning, the virus scanner continually examines the computers memory and file system and automatically activates each time one of these resources is accessed by an application.

While on-access and on-demand scanners may have some similarities, including some of the same programming code, the on-access scanner is typically tasked with more than just examining files and therefore often shoulders the responsibility for most of the active anti-virus protection provided to the computer system and end-user. On-access scanners are typically responsible for halting the execution of Viruses, Trojan horses, and other malevolent applications.

In many cases, in order to scan a given computer system's memory and file system, a suspect, or unknown, application, also referred to herein as simply an application, must be allowed to execute so it has the opportunity to decrypt, and open, its code, including any malevolent code, i.e., virus code. Once the suspect application decrypts its code, the code can be checked for known virus code. However, ideally, anti-virus systems and methods should examine a suspect application's behavior, i.e., execute the application, before the suspect application is passed onto the native computer system and then halt any application containing virus code before the application executes in the native computer system. Consequently, the issue becomes how to execute a suspect application, and prompt/convince the suspect application to decrypt its code, so that code can be examined, without executing the suspect application on the native computer system. A method commonly used by prior art anti-virus systems and methods to resolve this issue was to simulate running all, or part, of a suspect application's code in a virtual machine emulator before allowing the application access to the native computer system.

A virtual machine emulator is typically interposed between any suspect applications and the operating system of the native computer system. The virtual machine emulator then provides an environment, typically implemented in software, which tricks suspect applications into decrypting their code by simulating running conditions on the native computer system, typically by appearing to provide all the hardware services that a real computer would provide. The anti-virus system employing the virtual machine emulator then examines the suspect applications, typically all unknown applications are considered suspect applications, checks for known virus code and observes how the application would interact with processors, files, memory areas and network functions, if the suspect application were allowed access to the native computer system.

Since, a virtual machine emulator works as an interposed process, effectively performing a gating function to the native computer system, there are several critical design issues associated with virtual machine emulators. First and foremost, the virtual machine emulator must perform its task in a reasonable amount of time so that there is only minor degradation to the native computer system's performance. This is particularly important because experience has shown that if the scanning process significantly slows computer system performance, the end-user will simply disable the scanning function, typically forfeiting all protection, and thereby completely defeat the purpose of having the virtual machine emulator, or any anti-virus system, in the first place.

In addition, the virtual machine emulator must be complex enough to include sufficient aspects of the environment the virtual machine emulator is tasked to simulate so that the virtual machine emulator can be employed in different native computer system configurations, including various versions, variations and generations of components making up the native computer systems, such as processors, operating systems, patches, and memory size. In addition, the virtual machine emulator must be complex enough to perform well in the presence of anti-emulation and emulation detection techniques employed in some newer virus code. In short, the virtual machine emulator must work on multiple possible native computer system configurations and work even in the presence of protected viruses.

In the prior art, these two design issues for virtual machine emulators had to be constantly balanced by the prior art anti-virus system and/or method employing the virtual machine emulator and, at times, were almost mutually exclusive. That is to say, in the prior art, in order for a virtual machine emulator to work well, even in the presence of multiple possible native computer system component versions and anti-emulation and emulation detection protected viruses, the virtual machine emulator typically ran for far too long and significantly hindered the native computer system performance. On the other hand, in the prior art, if the virtual machine emulator were designed such that it did not significantly hinder the native computer system performance, all too often, the virtual machine could itself be tricked by a virus employing anti-emulation and/or emulation detection or the presence of virus code that was adapted to a specific variation or version of a computer system component. Consequently, in the prior art, there was a constant trade-off between system performance and effective emulation that resulted in less than ideal performance and protection.

As one example, in the prior art, when a prior art anti-virus system or method employing a virtual machine emulator encountered a situation where the computer system being emulated included one of multiple variations, or versions, of various computer system components, such as: different generations of processors; different generations of operating systems; different versions of patches and/or updates; or different memory sizes, i.e., an ambiguous state was encountered, the prior art anti-virus system or method employing the virtual machine emulator would typically emulate only one of variations or versions. The result was that if the wrong variation or version were chosen, the behavior of the suspect application being executed, and thereby tested, could be misrepresented.

In particular, in one example, a prior art anti-virus system or method employing a virtual machine emulator might readily emulate a given generation of a processor, for example a Pentium® 1 processor, in a given emulation iteration. Consequently, when the virtual machine emulator encountered a suspect application that decrypted its code using an instruction, or code, that was associated with, and supported by, only a Pentium® 2, or newer, generation processor, the suspect application would not be decrypted so the virus would not be detected. The result was that the virus was potentially passed onto the native computer system. Likewise, if the prior art anti-virus system or method employing a virtual machine emulator were set up such that it could readily emulate a Pentium® 2, or newer, generation processor, and the suspect application decrypted itself using an instruction, or code, that was associated with, and supported by, only Pentium® 1 processors, then, once again, the suspect application would not be decrypted, the virus would not be detected, and the virus could be passed onto the native computer system.

To make matters worse, as discussed above, the creators of viruses, and other malevolent code, have begun to include anti-emulation code in the viruses that is specifically designed to trick virtual machine emulators by making the application appear to be directed to one version, or variation, of a computer system component, when, in fact, the virus code actually decrypts in another version or variation.

Using the Pentium® processor example above, some new virus code containing applications include anti-emulation code, such as a processor specific instruction or flag, that would lead a prior art anti-virus system or method employing a virtual machine emulator to believe that the application is associated with, i.e., decrypted by, a Pentium® 1 processor. Consequently, the prior art anti-virus system or method employing a virtual machine emulator would run a Pentium® 1 processor emulation. However, in some cases, the virus is actually decrypted only by Pentium® 4, or later, processors. Consequently, the prior art anti-virus system or method employing a virtual machine emulator would run the wrong emulation, the virus would not be decrypted, and the virus could be passed onto the native computer system.

One possible solution to this deficiency of prior art anti-virus systems or methods employing virtual machine emulators was to either provide multiple virtual machine emulators, or emulation models capable of emulating each of the multiple possible versions or variations of the various computer system components. However, using this "solution" entailed allowing each virtual machine emulator, or emulation iteration, to run to completion and then running another emulation, or virtual machine emulator, to completion, and so on, until every version or variation was emulated to completion.

Continuing with the Pentium® processor example introduced above, if a prior art anti-virus system or method employing a virtual machine emulator were to run a Pentium® emulation to completion, a separate emulation would have to be run, to completion, for at least each of the Pentium® processor generations, six to date, and arguably, an emulation might also be needed for all legacy x86 processors including the 8086; 286, 386 and 486 series.

Likewise, for operating systems, using a prior art anti-virus system or method employing a virtual machine emulator, a complete emulation would arguably be required for every version of Microsoft Windows®, or MacOS®, or Solaris®. Likewise, a complete emulation might be required for every patch version to the operating system or BIOS, or for various computer system memory capacities and configurations.

Unfortunately, in many cases, running a single emulation to completion requires tens or even hundreds of millions of iterations to execute. Consequently, even a single emulation, run to completion, takes a noticeable amount of time and has a negative effect on overall computer system performance. Therefore, the running of two or more emulations to completion results in unacceptable degradation of overall system performance, and can take in the range of multiple minutes or more to complete. In addition, if, as is often the case, there were more than one computer system component that had multiple possible versions, variations, or generations, such as, multiple processor generation possibilities and multiple operating system version possibilities, there is a potential explosion, and literally exponential expansion, of combinations and potential emulations that would need to be run to completion to adequately test, and protect, a given computer system using prior art anti-virus methods and systems that employed virtual machine emulators. Clearly this is an unacceptable drain on computer system performance and an unworkable situation. Consequently, in the prior art, significant gaps in protection were created, and allowed, as compromises were made to keep native computer system performance at reasonable levels.

SUMMARY OF THE INVENTION

One embodiment of a method and apparatus for ambiguous-state support in virtual machine emulators, as described herein, leverages the fact that most versions, variations, or generations of a given computer system component such as: different generations of processors; different generations of operating systems; different versions of patches and/or updates; or different memory sizes, include a core set of non-variable behaviors, i.e., behaviors that are common to all versions, variations, and generations of the given computer component, and that often these non-variable behaviors comprise the vast majority of behaviors associated with any given version, variation, or generation of a given computer system component.

In one embodiment, the existence of these core, non-variable behaviors, is used by the method and apparatus for ambiguous-state support in virtual machine emulators, as described herein, to perform a first, core, or baseline, emulation for all versions, variations, or generations of a given computer system component, using a first emulation model, thereby capturing the core, non-variable behaviors. Then, using the method and apparatus for ambiguous-state support in virtual machine emulators, as described herein, when an ambiguous behavior, i.e., a first version variable behavior, is detected at a point of first version variable behavior detection in the first emulation model, i.e., at the occurrence/request/trigger of a first version variable behavior by the suspect application, a copy of the first emulation model state up to the point of first version variable behavior detection is made. In one embodiment, once the copy is made, the method and apparatus for ambiguous-state support in virtual machine emulators described herein branches at the point of first version variable behavior detection in the first emulation model. According to one embodiment, each branch, the core branch and the behavior 2 branch, is then emulated in its own emulation model, with the behavior 2 branch only being emulated in its own emulation model from the point of ambiguity, i.e., from the point of first version variable behavior detection in the first emulation model, forward.

According to one embodiment, successive occurrences of version variable behavior by the suspect application results: in successive version variable behavior branches of a given emulation model; successive copies of the emulation state at the respective successive version variable behavior branch points being generated; and successive version variable emulations from the version variable behavior branch points forward using version specific emulation models.

As discussed above, using one embodiment of a method and apparatus for ambiguous-state support in virtual machine emulators, as described herein, different versions, variations, or generations of a given computer system component are supported in a single emulation, up to the point where version variable behavior is detected. Consequently, the core or non-variable behaviors that typically constitute the vast majority of behaviors associated with any given version, variation, or generation of a given computer component are emulated in a single emulation iteration. Then, according to one embodiment, only the relatively few version variable behaviors associated with specific individual versions, variations, or generations of a given computer system component are run as separate, or version variable behavior branched, emulations. Consequently, according to one embodiment of a method and apparatus for ambiguous-state support in virtual machine emulators, as described herein, only one complete emulation is actually run from beginning to end, using minimal resources and time, while still providing protection for multiple versions, variations, or generations of a given computer system component. This is in direct contrast to the highly redundant, and inefficient, prior art anti-virus systems and methods discussed above, where a complete emulation would be run for each version, variation, or generation of a given computer system component, for every behavior, including multiple runs of all the common non-variable behaviors, from beginning to end.

Embodiments are best understood by reference to the following detailed description when read in conjunction with the accompanying drawings.

BRIEF DESCRIPTION OF THE DRAWINGS

FIGS. 2A, 2B1, 2B2 and 2C together show one embodiment of a process for ambiguous-state support in virtual machine emulators.

Figure 1:
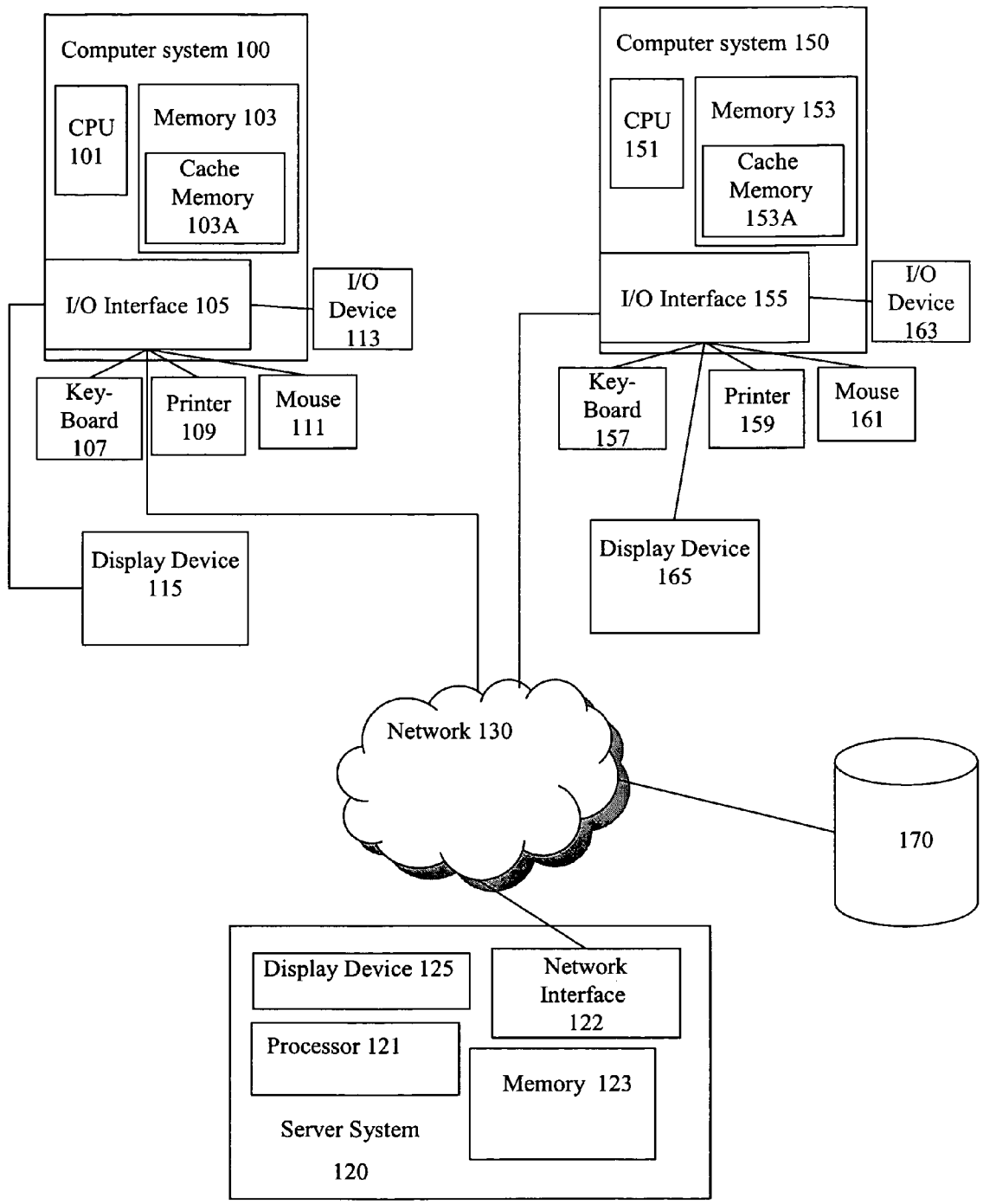
FIG. 1 is a block diagram of an exemplary hardware architecture for implementing one embodiment.

Common reference numerals are used throughout the drawings and detailed description to indicate like elements. One skilled in the art will readily recognize that the above FIG.s are merely examples and that other architectures, models of operation, orders of operation and elements/functions can be provided and implemented without departing from the essential characteristics and features of the invention.

DETAILED DESCRIPTION

The present invention will now be discussed with reference to the accompanying FIG.s, which depict one or more exemplary embodiments of the invention. The invention may be embodied in many different forms and should not be construed as limited to the embodiments set forth herein, shown in the FIG.s, and/or described below. Rather, these exemplary embodiments are provided to allow a complete disclosure that conveys the principles and spirit of the invention to those of skill in the art.

One embodiment of a method and apparatus for ambiguous-state support in virtual machine emulators includes a process for ambiguous-state support in virtual machine emulators (200 In FIGS. 2A. 2B1, 2B2, and 2C) that leverages the fact that most versions, variations, or generations of a given computer system component such as: different generations of processors; different generations of operating systems; different versions of patches and/or updates; or different memory sizes, include a core set of non-variable behaviors, i.e., behaviors that are common to all versions, variations, and generations of the given computer component, and that often these non-variable behaviors comprise the vast majority of behaviors associated with any given version, variation, or generation of a given computer system component.

In one embodiment, the existence of these core, non-variable behaviors, is used by the method and apparatus for ambiguous-state support in virtual machine emulators, as described herein, to perform a core, or baseline, emulation using a core emulation model for all versions, variations, or generations of a given computer system component, thereby capturing the core, non-variable behaviors. Then, using the method and apparatus for ambiguous-state support in virtual machine emulators, as described herein, when ambiguous behavior, i.e., version variable behavior, is detected, i.e., at the occurrence/request/trigger of a version variable behavior by the suspect application, a copy of the emulation state up to the point of the occurrence of the version variable behavior is made (209 in FIG. 2A, 219 in FIG. 2B1, 227 in FIG. 2B2, and 241 in FIG. 2C). In one embodiment, once the copy is made, the method and apparatus for ambiguous-state support in virtual machine emulators described herein branches (214/215 in FIG. 2A, 222/223 in FIG. 2B1, 228/229 in FIG. 2B2, and 248/249 in FIG. 2C) the process for ambiguous-state support in virtual machine emulators at the point of version variable behavior detection (210 in FIG. 2A, 220 in FIG. 2B1, 230 in FIG. 2B2, and 250 in FIG. 2C) where the ambiguous behavior, i.e., version variable behavior, was detected. According to one embodiment, each branch, the original branch and the version variable behavior branch, is then emulated with its own emulation model, with the version variable behavior branch being emulated in a version specific emulation model, and only being emulated from the point of ambiguity, i.e., from the version variable behavior branch point, also called the version variable behavior detection point, (210 in FIG. 2A, 220 in FIG. 2B1, 230 in FIG. 2B2, and 250 in FIG. 2C), forward.

According to one embodiment, successive occurrences of version variable behavior by the suspect application results: in successive version variable behavior branches of a given emulation; successive copies of the emulation state at the respective successive version variable behavior branch points being generated; and successive version variable behavior branches being emulated by version specific emulation models only from their respective version variable behavior branch points, i.e., the version variable behavior detection points, forward.

As discussed above, using one embodiment of a method and apparatus for ambiguous-state support in virtual machine emulators, as described herein, different versions, variations, or generations of a given computer system component are supported in a single emulation, up to the point where version variable behavior is detected. Consequently, the core or non-variable behaviors that typically constitute the vast majority of behaviors associated with any given version, variation, or generation of a given computer component are emulated in a single emulation. Then, according to one embodiment, only the relatively few version variable behaviors associated with specific individual versions, variations, or generations of a given computer system component are run in separate, or version variable behavior branched, emulation models. Consequently, according to one embodiment of a method and apparatus for ambiguous-state support in virtual machine emulators, as described herein, only one complete emulation is actually run, using minimal resources and time, while still providing protection for multiple versions, variations, or generations of a given computer system component. This is in direct contrast to the highly redundant, and inefficient, prior art anti-virus systems and methods discussed above, where a complete emulation would be run for each version, variation, or generation of a given computer system component, for every behavior, including multiple runs of all the common non-variable behaviors, from beginning to end.

In the discussion above and below, the terms, "malevolent code", "malevolent application", "virus code", "virus" and "viruses" are used interchangeably to denote code, applications, or portions of applications, programs or routines that that request, require, manipulate, or cause to be manipulated, operations upon, actions upon, transfers of, copies of, and movement of, data or other operations and actions within a native computer hardware or software system, or in anyway perform functions or actions, or cause functions or action to be performed, that are not intended by the end-user or the designer of native hardware and software systems.

Some embodiments are implemented in a conventional computer system running a conventional operating system such as: the Microsoft Windows® series of operating systems, for example, Microsoft Windows XP®, available from Microsoft Corporation of Redmond Wash.; the MacOS® series of operating systems, for example, MacOS X®, available from Apple Computer Inc. of Cupertino Calif.; any Unix operating system, for example, the Solaris® 7 series of operating systems, available from Sun Microsystems of Santa Clara Calif.; any Linux operating system; the Palm OS® series of operating systems; or any other operating system designed to generally manage operations on a computer system. In addition, as described more fully below, embodiments can be implemented on devices other than a conventional computer system such as, for example, a personal digital assistant, a cell phone, computer devices in which one or more computing resources are located remotely and accessed via a network, such as a Local Area Network (LAN), Wide Area Network (WAN), the Internet, or any mechanism that enables data communication between two computer devices. Embodiments may be included as add-on software for existing software programs, packages or applications, and embodiments may be a feature of an application that is bundled with a computer system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the process for ambiguous-state support in virtual machine emulators described herein makes use of input provided to the computer system implementing the process for ambiguous-state support in virtual machine emulators described herein via user interface devices such as a keyboard, mouse, touchpad, or the like.

More particularly, FIG. 1 is a block diagram of an exemplary hardware architecture for implementing one embodiment of a process for ambiguous-state support in virtual machine emulators, such as process for ambiguous-state support in virtual machine emulators 200, discussed below, that includes: a computer system 100, e.g., a first computer system; a computer system 150, e.g., a second computer system; a server system 120; and a database 170, all operatively connected by a network 130.

As seen in FIG. 1, computer system 100, sometimes called a native computer system or user computer device, typically includes a central processing unit (CPU) 101, hereinafter processor 101, an input output (I/O) interface 105, and a memory system 103, including cache memory 103A. Computer system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port for inputting data to, and outputting data from, computer system 100. As discussed in more detail below, in one embodiment, a process for ambiguous-state support in virtual machine emulators, such as process for ambiguous-state support in virtual machine emulators 200, discussed below, can be loaded, in whole, or in part, into computer system 100 via I/O device 113, such as from a CD, DVD or floppy disk containing all, or part of, a process or application for contextual budgeting.

Similarly, computer system 150, also sometimes called a native computer system or user computer device, typically includes a central processing unit (CPU) 151, hereinafter processor 151, an input output (I/O) interface 155, and a memory system 153, including cache memory 153A. Like computer system 100, computer system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port for inputting data to, and outputting data from, computer system 150. As discussed in more detail below, in one embodiment, a process for ambiguous-state support in virtual machine emulators, such as process for ambiguous-state support in virtual machine emulators 200, discussed below, can be loaded, in whole, or in part, into computer system 150 via I/O device 163, such as from a CD, DVD or floppy disk containing all, or part of, a process for ambiguous-state support in virtual machine emulators, such as process for ambiguous-state support in virtual machine emulators 200.

Also shown in FIG. 1 is database 170. In one embodiment, database 170 is simply a designated server system or computer system, or a designated potion of a server system or computer system, such as systems 100, 150, and 120. In one embodiment, database 170 is relational database and/or a dedicated mass storage device implemented in software, hardware, or a combination of hardware and software. In one embodiment, database 170 is a web-based function. As discussed in more detail below, in one embodiment, a process for ambiguous-state support in virtual machine emulators, such as process for ambiguous-state support in virtual machine emulators 200, discussed below, is stored in whole, or in part, in database 170.

In one embodiment, computer systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process for ambiguous-state support in virtual machine emulators, such as process for ambiguous-state support in virtual machine emulators 200, discussed below, is stored in whole, or in part, in server system 120.

Network 130 can be any network or network system that is of interest to an end-user such as a Local Area Network (LAN), a Wide Area Network (WAN), the Internet, or any mechanism that enables data transfer and/or communication between two computer devices. In various embodiments, server system network interface 122 and I/O interfaces 105 and 155 include analog modems, digital modems, a network interface card, a broadband connection, or any other means for connecting computer systems 100 and 150, and database 170, to server system 120 via network 130.

Those of skill in the art will readily recognize that the systems shown in FIG. 1, such as computer systems 100 and 150, database 170, and server system 120, and their respective components, are shown for illustrative purposes only and that architectures with more or fewer components can implement, and benefit from, the invention. In addition, the particular type of, and configuration of, computer systems 100 and 150, database 170, and server system 120 are not essential to the present invention.

As discussed in more detail below, in one embodiment, a process for ambiguous-state support in virtual machine emulators, such as process for ambiguous-state support in virtual machine emulators 200, discussed below, is stored in whole, or in part, in memory system 103 and/or cache memory 103A, of computer system 100, and/or memory system 153 and/or cache memory 153A of computer system 150, and/or in server memory system 123 of server system 120 and/or in database 170, and executed on computer system 100 and/or computer system 150. As used herein, a memory refers to a volatile memory, a non-volatile memory, or a combination of the two.

Although a process for ambiguous-state support in virtual machine emulators, such as process for ambiguous-state support in virtual machine emulators 200, discussed below, is sometimes referred to herein, alternatively, as an application, a program, a component of a software system, or a component of a software package, or a component of a parent system, this terminology is illustrative only. In some embodiments, a process for ambiguous-state support in virtual machine emulators, such as process for ambiguous-state support in virtual machine emulators 200, discussed below, is capable of being called from an application or the operating system.

In one embodiment, an application or program is generally defined to be any executable code. Moreover, those of skill in the art will understand that when it is said that an application or an operation takes some action, the action is the result of executing one or more instructions by a processor, such as processors 101 and 151, or server system processor 121. In one embodiment, execution of a process for ambiguous-state support in virtual machine emulators, such as process for ambiguous-state support in virtual machine emulators 200, discussed below, by processor 101 or processor 151, results in the operations of an agent computer process (not shown) and/or a rule computer process (not shown).

In one embodiment, a process for ambiguous-state support in virtual machine emulators, such as process for ambiguous-state support in virtual machine emulators 200, discussed below, is a computer application or process implemented and/or run and/or stored, in full, or in part, in, or on, a computer program product. Herein, a computer program product comprises a medium configured to store or transport computer readable code. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, representing computer readable code. This medium may belong to a computer system, such as computer systems 100 and 150 of FIG. 1, described above. However, the medium also may be removed from the computer system.

For example, all, or part of, a process for ambiguous-state support in virtual machine emulators, such as process for ambiguous-state support in virtual machine emulators 200, discussed below, may be stored in a memory that is physically located in a location, such as server system memory 123, or database 170, of FIG. 1, different from a computer system, such as computer systems 100 and/or 150 of FIG. 1, utilizing the a process for ambiguous-state support in virtual machine emulators, such as process for ambiguous-state support in virtual machine emulators 200, discussed below. In one embodiment, all, or part of, a process for ambiguous-state support in virtual machine emulators, such as process for ambiguous-state support in virtual machine emulators 200, discussed below, may be stored in a memory that is physically located, separate from the computer system's processor(s), such as processors 101 and 151 of FIG. 1, and the computer system processor(s) can be coupled to the memory in a client-server system, such as server system 120 of FIG. 1, or, alternatively, via a connection to another computer, such as computer systems 100, 150 of FIG. 1, via modems and analog lines, digital interfaces and a digital carrier line, or wireless or cellular connections.

In one embodiment, the computer systems and/or server systems running and/or utilizing and/or storing all, or part, of a process for ambiguous-state support in virtual machine emulators, such as process for ambiguous-state support in virtual machine emulators 200, discussed below, such as computer systems 100 and/or 150 and/or server system 120 of FIG. 1, is a portable computer, a workstation, a two-way pager, a cellular telephone, a smart phone, a digital wireless telephone, a personal digital assistant, a server computer, an Internet appliance, or any other device that includes components that can execute all, or part of, a process for ambiguous-state support in virtual machine emulators, such as process for ambiguous-state support in virtual machine emulators 200, discussed below, in accordance with at least one of the embodiments as described herein. Similarly, in another embodiment, a process for ambiguous-state support in virtual machine emulators, such as process for ambiguous-state support in virtual machine emulators 200, discussed below, is implemented on and/or run and/or stored on a computer system and/or server system that is comprised of multiple different computers, wireless devices, cellular telephones, digital telephones, two-way pagers, personal digital assistants, server computers, or any desired combination of these devices, that are interconnected to perform the methods as described herein.

FIGS. 2A, 2B1, 2B2 and 2C together show one embodiment of a process for ambiguous-state support in virtual machine emulators 200. Process for ambiguous-state support in virtual machine emulators 200 begins at ENTER OPERATION 201. From ENTER OPERATION 201 process flow proceeds to CREATE VIRTUAL MACHINE EMULATOR OPERATION 203. At CREATE VIRTUAL MACHINE EMULATOR OPERATION 203, all virtual machine emulators, or emulation models, required for a given implementation of a process for ambiguous-state support in virtual machine emulators, such as process for ambiguous-state support in virtual machine emulators 200, are created Virtual machine emulators are well known in to those of skill in the art. As discussed above, a virtual machine emulator is typically interposed between any suspect applications and the operating system of the native computer system, such as computer systems 100, 150 and server system 120 of FIG. 1. In one embodiment, the virtual machine emulator then provides an environment, or emulation model, typically implemented in software, which tricks suspect applications into decrypting their code by simulating running conditions on the native computer system, typically by appearing to provide all the hardware services that a real computer would provide.

Virtual machine emulators work based on the fact that a "real", i.e., hardware based, or native, computer system, such as computer systems 100 and 150, and server system 120 of FIG. 1, provides an operating system (not shown), and any application running on the operating system (not shown), various resources, including: a processor, such as processors 101, 121 and 151 of FIG. 1; Input/Output (I/O) channels, such I/O interfaces 105 and 155 of FIG. 1; memory, such as memory systems 103, 153, and 123, including cache memories 103A and 153A; a Basic I/O System (BIOS) (not shown) to provide low level access to motherboard; and I/O resources, such as I/O devices 113, 163. Using a virtual machine emulator, it's possible to appear to give a suspect application, malevolent or legitimate, all the hardware resources it needs, without actually allowing the suspect application access to the native computer system, such as computer systems 100 and 150 and server system 120. In principle, when a virtual machine emulator is used correctly, the suspect application never knows whether it's really accessing hardware, or if it is being tricked by the virtual machine emulator and merely being given resources which simulate/emulate hardware.

Typically, a virtual machine emulator is divided into modules that correspond roughly to the emulated computer's subsystems. Most often, a virtual machine emulator is composed of at least the following modules: a processor emulator or processor simulator, the two terms are mostly interchangeable in the art (not shown); a memory subsystem module (not shown); and various I/O device emulators (not shown). The processor emulator is often the most complicated part of a virtual machine emulator. Many virtual machine emulators are written using "pre-packaged", i.e., hard-coded, processor emulators or emulation models in order to concentrate on good and efficient emulation of a processor and/or processor version, variation, or generation.

The simplest form of a processor emulator is an interpreter. An interpreter follows the execution flow of the emulated program code and, for every machine code instruction encountered, executes operations on the host processor that are semantically equivalent to the original instructions. This is made possible by assigning a variable to each register and flag of the emulated processor. The logic of the emulated processor can then be, more or less, directly translated into software algorithms, creating a software re-implementation, i.e., an emulation model that basically mirrors the original hardware implementation.

As noted above, the methods of creation, structure, and operation of virtual machine emulators and emulation models is well known to those of skill in the art. Consequently, a more detailed discussion of the methods of creation, structure, and operation of virtual machine emulators and emulation models is omitted here to avoid detracting from the invention.

In one embodiment, the various data associated with the creation of the virtual machine emulator, emulation models, and the virtual machine emulator itself, of CREATE VIRTUAL MACHINE EMULATOR OPERATION 203 is saved by storing the data and/or and the virtual machine emulator itself, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory, mass memory, or the like, associated with a computer system, such as computer systems 100, 151, described above. In one embodiment, the data and/or and the virtual machine emulator itself, in whole, or in part, is stored in any computer system and/or server system, such as computer systems 100, 151, or server system 120, or other device, in another location, or on/in a computer readable medium, and/or any other computer program product, as defined herein. In one embodiment, the data and/or and the virtual machine emulator itself, in whole, or in part, is stored on a webpage or in a web-based system.

Once a virtual machine emulator, or emulators, or emulation models, is/are created at CREATE VIRTUAL MACHINE EMULATOR OPERATION 203, process flow proceeds to RECEIVE APPLICATION OPERATION 205. At RECEIVE APPLICATION OPERATION 205, a suspect application is received to be run on the virtual machine emulator created at CREATE VIRTUAL MACHINE EMULATOR OPERATION 203. In one embodiment, all unknown applications, from any source, that attempt to access the native computer system's memory, such as memories 103 and 153 of computer systems 100 and 150 of FIG. 1, are considered suspect applications and are therefore sent to the virtual machine emulator before they are allowed to run on the native computer system.

Once a suspect application is received at RECEIVE APPLICATION OPERATION 205, process flow proceeds to EXECUTE APPLICATION WITHIN FIRST EMULATION MODEL OPERATION 207. At EXECUTE APPLICATION WITHIN FIRST EMULATION MODEL OPERATION 207, process for ambiguous-state support in virtual machine emulators 200 begins to execute the suspect application in the core behavior emulation model, also called a first emulation model. As discussed above, using one embodiment of process for ambiguous-state support in virtual machine emulators 200, different versions, variations, or generations of a given computer system component are supported in a single emulation, i.e., the core behavior emulation model of EXECUTE APPLICATION WITHIN FIRST EMULATION MODEL OPERATION 207. Recall that the goal the virtual machine emulator is to trick the suspect application to execute, so the suspect application decrypts, and opens, its code, including any malevolent code, i.e., virus code. Once the suspect application decrypts its code, the code can be checked for known virus code.

In some situations (not shown), where there is only one version, variation, or generation of a computer system component, EXECUTE APPLICATION WITHIN FIRST EMULATION MODEL OPERATION 207 is the only stage/model of emulation required and process for ambiguous-state support in virtual machine emulators 200 runs to completion in the first emulation model.

In one embodiment, process for ambiguous-state support in virtual machine emulators 200 continues in EXECUTE APPLICATION WITHIN FIRST EMULATION MODEL OPERATION 207 up to the point where version variable behavior is detected, also called a point of first version variable behavior detection, within the first emulation model. Consequently, the core or non-variable behaviors that typically constitute the vast majority of behaviors associated with any given version, variation, or generation of a given computer system component are emulated in a single emulation up to the point where version variable behavior, if present, is detected.

In this one illustrative example, a version variable behavior is detected at DETECT VARIABLE BEHAVIOR 1 OPERATION 208. The first version variable behavior detected at DETECT VARIABLE BEHAVIOR 1 OPERATION 208 can be any behavior on the part of the suspect application that indicates the application must execute on a particular version, variation, or generation of the computer system component, such as: different generations of processors; different generations of operating systems; different versions of patches and/or updates; or different memory sizes. The version variable behavior itself may be a specific instruction, memory request, flag, or operation that is indicative of a particular version, variation, or generation of the computer system component.

As an example, specific processor flags set by an instruction issued/requested by the suspect application can indicate that a particular generation of a given processor line is required, for instance a Pentium® 3 or greater processor versus a Pentium® 2 or less processor. As another example, a particular operating system may be indicated by actions on the part of the application indicating, for example, that a DOS environment is needed for execution, as opposed to a Windows® environment, or Windows XP® is required as opposed to Windows 98®. Other possible conditions can be indicated by version variable behavior detected at DETECT VARIABLE BEHAVIOR 1 OPERATION 208 such as the presence of specific drivers or memory needs/requests.

Whatever the particular first version variable behavior detected at DETECT VARIABLE BEHAVIOR 1 OPERATION 208, in one embodiment, once the first version variable behavior is detected, process flow proceeds to SAVE EMULATION STATE 1/COPY EMULATION STATE 1 OPERATION 209. At SAVE EMULATION STATE 1/COPY EMULATION STATE 1 OPERATION 209, the data associated with the first emulation model state of EXECUTE APPLICATION WITHIN FIRST EMULATION MODEL OPERATION 207, up to the point, branch point 210, where first version variable behavior was detected at DETECT VARIABLE BEHAVIOR 1 OPERATION 208, is saved and a copy of the data indicating the first emulation model state in EXECUTE APPLICATION WITHIN FIRST EMULATION MODEL OPERATION 207, up to branch point 210, is generated.

In one embodiment, the various data associated with the first emulation model state in EXECUTE APPLICATION WITHIN FIRST EMULATION MODEL OPERATION 207, up to branch point 210, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory, mass memory, or the like, associated with a computer system, such as computer systems 100, 151, described above. In one embodiment, the data, in whole, or in part, is stored in any computer system and/or server system, such as computer systems 100, 151, or server system 120, or other device, in another location, or on/in computer readable medium, and/or any other computer program product, as defined herein. In one embodiment, the data, in whole, or in part, is stored on a webpage or in a web-based system.

Once the first emulation model state at branch point 210 is saved and copied at SAVE EMULATION STATE 1/COPY EMULATION STATE 1 OPERATION 209, process for ambiguous-state support in virtual machine emulators 200 splits, or branches, into two branches, core branch 214 and behavior 2 branch 215. Core branch 214 proceeds to CONTINUE TO EXECUTE APPLICATION WITHIN FIRST EMULATION MODEL OPERATION 211A. At CONTINUE TO EXECUTE APPLICATION WITHIN FIRST EMULATION MODEL OPERATION 211A, the suspect application continues to be executed as it was in EXECUTE APPLICATION WITHIN FIRST EMULATION MODEL OPERATION 207. In one embodiment, execution of the suspect application continues at CONTINUE TO EXECUTE APPLICATION WITHIN FIRST EMULATION MODEL OPERATION 211A, up to the point where a second version variable behavior, if present, is detected. In short, the suspect application continues to be executed as it was before the detection of the first version variable behavior at branch point 210, and process flow passes through PROCEED TO 216B OF FIG. 2B1 PORT 214A, to FIG. 2B1, through FROM 214A OF FIG. 2A PORT 216B to DETECT VARIABLE BEHAVIOR 2 OPERATION 218.

In this specific example, a second version variable behavior is detected at DETECT VARIABLE BEHAVIOR 2 OPERATION 218. As discussed above with respect to DETECT VARIABLE BEHAVIOR 1 OPERATION 208, the version variable behavior detected at DETECT VARIABLE BEHAVIOR 2 OPERATION 218 can be any behavior on the part of the suspect application that indicates the application must execute on a particular version, variation or generation of the computer system component, such as: different generations of processors; different generations of operating systems; different versions of patches and/or updates; or different memory sizes. The behavior itself may be a specific instruction, memory request, flag, or operation that is indicative of a particular version, variation, or generation of the computer system component.

Continuing with the Pentium® specific example discussed above, specific processor flags set by an instruction issued/requested by the suspect application can indicate that a particular generation of a given processor line is required, for instance a Pentium® 2 versus a Pentium® 1 processor.

Whatever the particular version variable behavior detected at DETECT VARIABLE BEHAVIOR 2 OPERATION 218, in one embodiment, once the second version variable behavior is detected, process flow proceeds to SAVE EMULATION STATE 2/COPY EMULATION STATE 2 OPERATION 219. At SAVE EMULATION STATE 2/COPY EMULATION STATE 2 OPERATION 219, the data associated with the first emulation model state in CONTINUE TO EXECUTE APPLICATION WITHIN FIRST EMULATION MODEL OPERATION 211A, up to the point where the second version variable behavior is detected at DETECT VARIABLE BEHAVIOR 2 OPERATION 219, i.e., up to branch point 220, also called the point of second version variable detection, is saved and a copy of the data indicating the first emulation model state in CONTINUE TO EXECUTE APPLICATION WITHIN FIRST EMULATION MODEL OPERATION 211A, up to branch point 220, is generated.

In one embodiment, the various data associated with the first emulation model state in CONTINUE TO EXECUTE APPLICATION WITHIN FIRST EMULATION MODEL OPERATION 211A, up to branch point 220, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory, mass memory, or the like, associated with a computer system, such as computer systems 100, 151, described above. In one embodiment, the data, in whole, or in part, is stored in any computer system and/or server system, such as computer systems 100, 151, or server system 120, or other device, in another location, or on/in computer readable medium, and/or any other computer program product, as defined herein. In one embodiment, the data, in whole, or in part, is stored on a webpage or in a web-based system.

Once the first emulation model state at branch point 220 is saved and copied at SAVE EMULATION STATE 2/COPY EMULATION STATE 2 OPERATION 219, process for ambiguous-state support in virtual machine emulators 200 splits, or branches, again into two branches, core branch 222 and behavior 3 branch 223. Core branch 222 proceeds to CONTINUE TO EXECUTE APPLICATION WITHIN FIRST EMULATION MODEL OPERATION 221B. At CONTINUE TO EXECUTE APPLICATION WITHIN FIRST EMULATION MODEL OPERATION 221B, the suspect application continues to be executed as it was in CONTINUE TO EXECUTE APPLICATION WITHIN FIRST EMULATION MODEL OPERATION 211A and EXECUTE APPLICATION WITHIN FIRST EMULATION MODEL OPERATION 207. In one embodiment, execution of the suspect application continues at CONTINUE TO EXECUTE APPLICATION WITHIN FIRST EMULATION MODEL OPERATION 221B, up to the point where a third version variable behavior, if present, is detected.

In this one specific example, it is presupposed that there are no more version variable behaviors detected within the first emulation model at CONTINUE TO EXECUTE APPLICATION WITHIN FIRST EMULATION MODEL OPERATION 221B and process flow proceeds, in this particular example, to END OF APPLICATION EXECUTION WITHIN FIRST EMULATION MODEL OPERATION 224. At END OF APPLICATION EXECUTION WITHIN FIRST EMULATION MODEL OPERATION 224, the suspect application is executed either to completion, or as far as is deemed necessary. Once the suspect application is done executing, process flow proceeds to VIRUS DETECTED? OPERATION 280.

At VIRUS DETECTED? OPERATION 280, a determination is made as to whether any of the code decrypted by the suspect application thus far is malevolent, or virus, code. If it is determined that the suspect application did include virus code at VIRUS DETECTED? OPERATION 280, i.e., a YES result is obtained at VIRUS DETECTED? OPERATION 280, then the suspect application is quarantined at QUARANTINE APPLICATION OPERATION 284, and thereby prevented from executing on the native computer system.

If, on the other hand, it is determined that the suspect application did not include any virus code at VIRUS DETECTED? OPERATION 280, i.e., a NO result is obtained at VIRUS DETECTED? OPERATION 280, then the results are considered indeterminate since only the core branch results are available and the process flow proceeds to INDETERMINATE RESULT/AWAIT RESULTS FROM OTHER BRANCHES OPERATION 286. From INDETERMINATE RESULT/AWAIT RESULTS FROM OTHER BRANCHES OPERATION 286, process flow moves, in this example, to GO TO COMPILE RESULTS FROM ALL BRANCHES OPERATION 288C OF FIG. 2C OPERATION 288B1, where the results of the core, or first emulation model branch, including core branch 214 and core branch 222, of process for ambiguous-state support in virtual machine emulators 200 wait to be added to the results of the other branches.

Returning to branch point 220 of FIG. 2B1, recall that at branch point 220 and SAVE EMULATION STATE 2/COPY EMULATION STATE 2 OPERATION 219, the data associated with the first emulation model state of CONTINUE TO EXECUTE APPLICATION WITHIN FIRST EMULATION MODEL OPERATION 211A, up to the point of second version variable behavior detection at DETECT VARIABLE BEHAVIOR 2 OPERATION 219, i.e., branch point 220, was saved and a copy of the data indicating the first emulation model state in CONTINUE TO EXECUTE APPLICATION WITHIN FIRST EMULATION MODEL OPERATION 211A, up to branch point 220, was generated and process for ambiguous-state support in virtual machine emulators 200 split into two branches, core branch 222 and behavior 3 branch 223. Once the copy of the first emulation model state up to branch point 220 is made at SAVE EMULATION STATE 2/COPY EMULATION STATE 2 OPERATION 219, behavior 3 branch 223 of process for ambiguous-state support in virtual machine emulators 200 proceeds to EXECUTE APPLICATION WITHIN THIRD EMULATION MODEL FROM POINT OF BEHAVIOR 2 DETECTION OPERATION 223B.

Those of skill in the art will recognize that, in some embodiments, core branch 222 and behavior 3 branch 223 of process for ambiguous-state support in virtual machine emulators 200 can be performed simultaneously by two virtual machine emulators, or emulation models, on either separate threads of a multi-threaded processor, or through the use of dual processors, redundant systems, or data sharing models. In other embodiments, each branch 222 and 223 of process for ambiguous-state support in virtual machine emulators 200 is run, in whole, or in part, sequentially.

At EXECUTE APPLICATION WITHIN THIRD EMULATION MODEL FROM POINT OF BEHAVIOR 2 DETECTION OPERATION 223B, the copy of the first emulation model state of CONTINUE TO EXECUTE APPLICATION WITHIN FIRST EMULATION MODEL OPERATION 211A, up to branch point 220, where second version variable behavior was detected at DETECT VARIABLE BEHAVIOR 2 218, from SAVE EMULATION STATE 2/COPY EMULATION STATE 2 OPERATION 219, is incorporated and the suspect application is executed in the third emulation model, by either a modified version of the same virtual machine emulator of EXECUTE APPLICATION WITHIN FIRST EMULATION MODEL OPERATION 207, or by a separate virtual machine emulator, or emulation model, entirely. In one embodiment, the suspect application is executed in the third emulation model only from the point of second version variable behavior detection, i.e., point 220, while all the core behavior from the first emulation model state of EXECUTE APPLICATION WITHIN FIRST EMULATION MODEL OPERATION 207 and CONTINUE TO EXECUTE APPLICATION WITHIN FIRST EMULATION MODEL OPERATION 211A, up to branch point 220, is simply copied and incorporated, not re-executed. This is in direct contrast to the highly redundant, and inefficient, prior art anti-virus systems and methods discussed above, where a complete emulation would be run for each branch, including multiple runs of all the common non-variable behaviors, from beginning to end.

In one embodiment, execution of the suspect application continues at EXECUTE APPLICATION WITHIN THIRD EMULATION MODEL FROM POINT OF BEHAVIOR 2 DETECTION OPERATION 223B, up to the point where a third version variable behavior, if present, is detected.

In this one specific example, it is presupposed that there are no more version variable behaviors detected within the behavior 3 branch, including core behavior branch 214 and behavior 3 branch 223, of process for ambiguous-state support in virtual machine emulators 200 and process flow proceeds, in this particular example, to END OF APPLICATION EXECUTION WITHIN THIRD EMULATION MODEL OPERATION 226. At END OF APPLICATION EXECUTION WITHIN THIRD EMULATION MODEL OPERATION 226, the suspect application is executed either to completion, or as far as is deemed necessary. Once the suspect application is done executing, process flow proceeds to VIRUS DETECTED? OPERATION 282.

At VIRUS DETECTED? OPERATION 282, a determination is made as to whether any of the code decrypted by the suspect application thus far is malevolent, or virus, code. If it is determined that the suspect application did include virus code at VIRUS DETECTED? OPERATION 282, i.e., a YES result is obtained at VIRUS DETECTED? OPERATION 282, then the suspect application is quarantined at QUARANTINE APPLICATION OPERATION 284, and thereby prevented from executing on the native computer system.

If, on the other hand, it is determined that the suspect application did not include any virus code at VIRUS DETECTED? OPERATION 282, i.e., a NO result is obtained at VIRUS DETECTED? OPERATION 282, then the results are considered indeterminate since only the behavior 3 branch results are available and the process flow proceeds to INDETERMINATE RESULT/AWAIT RESULTS FROM OTHER BRANCHES OPERATION 286. From INDETERMINATE RESULT/AWAIT RESULTS FROM OTHER BRANCHES OPERATION 286, process flow moves, in this example, to GO TO COMPILE RESULTS FROM ALL BRANCHES OPERATION 288C OF FIG. 2C OPERATION 288B1, where the results of the behavior 3 branch, including core behavior branch 214 and behavior 3 branch 223, of process for ambiguous-state support in virtual machine emulators 200 wait to be added to the results of the other branches.

Figure 2A:
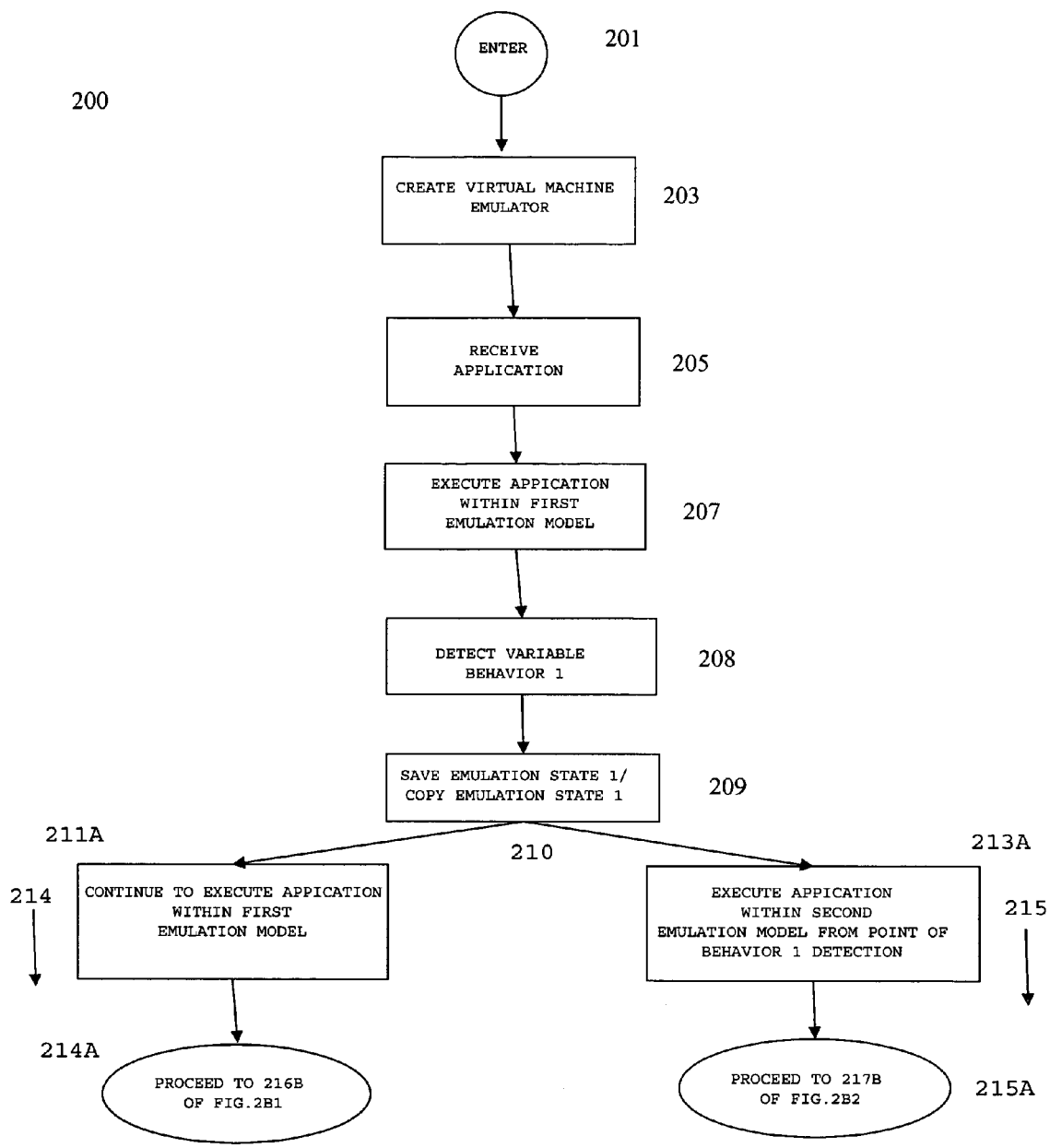

Returning to branch point 210 and FIG. 2A, recall that at branch point 210 and SAVE EMULATION STATE 1/COPY EMULATION STATE 1 OPERATION 209, the data associated with the first emulation model state in EXECUTE APPLICATION WITHIN FIRST EMULATION MODEL OPERATION 207, up to the point of the first version variable behavior detection, i.e., branch point 210, at DETECT VARIABLE BEHAVIOR 1 OPERATION 208, was saved and a copy of the data indicating the first emulation model state in EXECUTE APPLICATION WITHIN FIRST EMULATION MODEL OPERATION 207, up to branch point 210, was generated and process for ambiguous-state support in virtual machine emulators 200 split into two branches, core branch 214 and behavior 2 branch 215. Once the copy of the first emulation model state up to branch point 210 is made at SAVE EMULATION STATE 1/COPY EMULATION STATE 1 OPERATION 209, behavior 2 branch 215 of process for ambiguous-state support in virtual machine emulators 200 proceeds to EXECUTE APPLICATION WITHIN SECOND EMULATION MODEL FROM POINT OF BEHAVIOR 1 DETECTION OPERATION 213A. At EXECUTE APPLICATION WITHIN SECOND EMULATION MODEL FROM POINT OF BEHAVIOR 1 DETECTION OPERATION 213A, the suspect application is executed in a second emulation model, by either a modified version of the same virtual machine emulator, or emulation model, of EXECUTE APPLICATION WITHIN FIRST EMULATION MODEL OPERATION 207, or by a separate virtual machine emulator, or emulation model, entirely.

Those of skill in the art will recognize that, in one embodiment, core branch 214 and behavior 2 branch 215 of process for ambiguous-state support in virtual machine emulators 200 can be performed simultaneously by two virtual machine emulators, or emulation models, on either separate threads of a multi-threaded processor or through the use dual processors, redundant systems, or data sharing models. In other embodiments, each branch 214 and 215 of process for ambiguous-state support in virtual machine emulators 200 is run, in whole, or in part, sequentially.

In one embodiment, the suspect application continues to be executed in the second emulation model at EXECUTE APPLICATION WITHIN SECOND EMULATION MODEL FROM POINT OF BEHAVIOR 1 DETECTION OPERATION 213A and process flow passes through PROCEED TO 217B OF FIG. 2B2 PORT 215A, to FIG. 2B2, through FROM 215A OF FIG. 2A PORT 217B to DETECT VARIABLE BEHAVIOR 3 OPERATION 225.

In this one specific illustrative example, a version variable behavior is detected at DETECT VARIABLE BEHAVIOR 3 OPERATION 225 at a point of third version variable behavior detection within the second emulation model. As discussed above with respect to DETECT VARIABLE BEHAVIOR 1 OPERATION 208 and DETECT VARIABLE BEHAVIOR 2 OPERATION 218, the version variable behavior detected at DETECT VARIABLE BEHAVIOR 3 OPERATION 225 can be any behavior on the part of the suspect application that indicates the application must execute on a particular version, variation, or generation of the computer system component, such as: different generations of processors; different generations of operating systems; different versions of patches and/or updates; or different memory sizes. The behavior itself may be a specific instruction, memory request, flag, or operation that is indicative of a particular version, variation, or generation of the computer system component.

Continuing with the Pentium® specific example discussed above, specific processor flags set by an instruction issued/requested by the suspect application can indicate that a particular generation of a given processor line is required, for instance a Pentium® 4 processor or greater versus a Pentium® 3 processor.

Whatever the particular version variable behavior detected at DETECT VARIABLE BEHAVIOR 3 OPERATION 225, in one embodiment, once the third version variable behavior is detected at the point of third version variable behavior detection within the second emulation model, process flow proceeds to SAVE EMULATION STATE 3/COPY EMULATION STATE 3 OPERATION 227. At SAVE EMULATION STATE 3/COPY EMULATION STATE 3 OPERATION 227, the data associated with the second emulation model state in EXECUTE APPLICATION WITHIN SECOND EMULATION MODEL FROM POINT OF BEHAVIOR 1 DETECTION OPERATION 213A, up to the point of third version variable behavior detection within the second emulation model at DETECT VARIABLE BEHAVIOR 3 OPERATION 225, i.e., up to branch point 230, is saved and a copy of the data indicating the second emulation model state in EXECUTE APPLICATION WITHIN SECOND EMULATION MODEL FROM POINT OF BEHAVIOR 1 DETECTION OPERATION 213A, up to branch point 230, is generated.

In one embodiment, the various data associated with the second emulation model state in EXECUTE APPLICATION WITHIN SECOND EMULATION MODEL FROM POINT OF BEHAVIOR 1 DETECTION OPERATION 213A, up to the point of third version variable behavior detection within the second emulation model at DETECT VARIABLE BEHAVIOR 3 OPERATION 225, i.e., up to branch point 230, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory, mass memory, or the like, associated with a computer system, such as computer systems 100, 151, described above. In one embodiment, the data, in whole, or in part, is stored in any computer system and/or server system, such as computer systems 100, 151, or server system 120, or other device, in another location, or on/in computer readable medium, and/or any other computer program product, as defined herein. In one embodiment, the data, in whole, or in part, is stored on a webpage or in a web-based system.

Once the second emulation model state at branch point 230 is saved and copied at SAVE EMULATION STATE 3/COPY EMULATION STATE 3 OPERATION 227, process for ambiguous-state support in virtual machine emulators 200 splits, or branches, again into two branches, behavior 2 branch 228 and behavior 4 branch 229. Behavior 2 branch 228 proceeds to CONTINUE TO EXECUTE APPLICATION WITHIN SECOND EMULATION MODEL FROM POINT OF VARIABLE BEHAVIOR 3 DETECTION OPERATION 231B. At CONTINUE TO EXECUTE APPLICATION WITHIN SECOND EMULATION MODEL FROM POINT OF VARIABLE BEHAVIOR 3 DETECTION OPERATION 231B, the suspect application continues to be executed as it was in EXECUTE APPLICATION WITHIN SECOND EMULATION MODEL FROM POINT OF BEHAVIOR 1 DETECTION OPERATION 213A. In one embodiment, execution of the suspect application continues at CONTINUE TO EXECUTE APPLICATION WITHIN SECOND EMULATION MODEL FROM POINT OF VARIABLE BEHAVIOR 3 DETECTION OPERATION 231B, up to the point where a third version variable behavior, if present, is detected.

In this one specific illustrative example, it is presupposed that there are no more version variable behaviors detected within the second emulation model of CONTINUE TO EXECUTE APPLICATION WITHIN SECOND EMULATION MODEL FROM POINT OF VARIABLE BEHAVIOR 3 DETECTION OPERATION 231B and process flow proceeds, in this particular example, to END OF APPLICATION EXECUTION WITHIN SECOND EMULATION MODEL OPERATION 235. At END OF APPLICATION EXECUTION WITHIN SECOND EMULATION MODEL OPERATION 235, the suspect application is executed either to completion, or as far as is deemed necessary. Once the suspect application is done executing, process flow proceeds to VIRUS DETECTED? OPERATION 281.

At VIRUS DETECTED? OPERATION 281, a determination is made as to whether any of the code decrypted by the suspect application is malevolent, or virus, code. If it is determined that the suspect application did include virus code at VIRUS DETECTED? OPERATION 281, i.e., a YES result is obtained at VIRUS DETECTED? OPERATION 281, then the suspect application is quarantined at QUARANTINE APPLICATION OPERATION 285, and thereby prevented from executing on the native computer system.

If, on the other hand, it is determined that the suspect application did not include any virus code at VIRUS DETECTED? OPERATION 281, i.e., a NO result is obtained at VIRUS DETECTED? OPERATION 281, then the results are considered indeterminate since only the behavior 2 branch results are available and the process flow proceeds to INDETERMINATE RESULT/AWAIT RESULTS FROM OTHER BRANCHES OPERATION 283. From INDETERMINATE RESULT/AWAIT RESULTS FROM OTHER BRANCHES OPERATION 283, process flow moves, in this example, to GO TO COMPILE RESULTS FROM ALL BRANCHES OPERATION 288C OF FIG. 2C OPERATION 288B2, where the results of the behavior 2 branch, including behavior 2 branch 215 and behavior 2 branch 228, of process for ambiguous-state support in virtual machine emulators 200 wait to be added to the results of the other branches.

Returning to branch point 230, recall that at branch point 230 and SAVE EMULATION STATE 3/COPY EMULATION STATE 3 OPERATION 227, the data associated with the second emulation model state in EXECUTE APPLICATION WITHIN SECOND EMULATION MODEL FROM POINT OF BEHAVIOR 1 DETECTION OPERATION 213A, up to the point of third version variable behavior detection, branch point 230, and DETECT VARIABLE BEHAVIOR 3 OPERATION 225, was saved and a copy of the data indicating the second emulation model state in EXECUTE APPLICATION WITHIN SECOND EMULATION MODEL FROM POINT OF BEHAVIOR 1 DETECTION OPERATION 213A, up to branch point 230, was generated and process for ambiguous-state support in virtual machine emulators 200 split, or branched, again into two branches, behavior 2 branch 228 and behavior 4 branch 229. Once the copy of the emulation state up to branch point 230 is made at SAVE EMULATION STATE 3/COPY EMULATION STATE 3 OPERATION 227, behavior 4 branch 229 of process for ambiguous-state support in virtual machine emulators 200 proceeds to EXECUTE APPLICATION WITHIN FOURTH EMULATION MODEL FROM POINT OF BEHAVIOR 3 DETECTION OPERATION 233B. At EXECUTE APPLICATION WITHIN FOURTH EMULATION MODEL FROM POINT OF BEHAVIOR 3 DETECTION OPERATION 233B, the suspect application is executed in a fourth emulation model, by either a modified version of the same virtual machine emulator, or emulation model, of EXECUTE APPLICATION WITHIN SECOND EMULATION MODEL FROM POINT OF BEHAVIOR 1 DETECTION OPERATION 213A, or by a separate virtual machine emulator, or emulation model, entirely. In one embodiment, the suspect application is executed in a the fourth emulation model only from the point of third version variable behavior detection, i.e., point 230, while all the core and second emulation model data from the first and second emulation model states of EXECUTE APPLICATION WITHIN FIRST EMULATION MODEL OPERATION 207 and EXECUTE APPLICATION WITHIN SECOND EMULATION MODEL FROM POINT OF BEHAVIOR 1 DETECTION OPERATION 213A, up to branch point 230, is simply copied and incorporated, not re-executed. This is in direct contrast to the highly redundant, and inefficient, prior art anti-virus systems and methods discussed above, where a complete emulation would be run for each branch, including multiple runs of all the common non-variable behaviors, from beginning to end.

Those of skill in the art will recognize that, in one embodiment, behavior 2 branch 228 and behavior 4 branch 229 of process for ambiguous-state support in virtual machine emulators 200 can be performed simultaneously by two virtual machine emulators, or emulation models, on either separate threads of a multi-threaded processor, or through the use dual processors, redundant systems, or data sharing models. In other embodiments, each branch 228 and 229 of process for ambiguous-state support in virtual machine emulators 200 is run, in whole, or in part, sequentially.

In this one specific illustrative example, a version variable behavior is detected at DETECT VARIABLE BEHAVIOR 4 OPERATION 237. As discussed above with respect to DETECT VARIABLE BEHAVIOR 1 OPERATION 208, DETECT VARIABLE BEHAVIOR 2 OPERATION 218, and DETECT VARIABLE BEHAVIOR 3 OPERATION 225, the version variable behavior detected at DETECT VARIABLE BEHAVIOR 4 OPERATION 237 can be any behavior on the part of the suspect application that indicates the application must execute on a particular version, variation or generation of the computer system component, such as: different generations of processors; different generations of operating systems; different versions of patches and/or updates; or different memory sizes. The behavior itself may be a specific instruction, memory request, flag, or operation that is indicative of a particular version, variation or generation of the computer system component.

Continuing with the Pentium® specific example discussed above, specific processor flags set by an instruction issued/requested by the suspect application can indicate that a particular generation of a given processor line is required, for instance a Pentium® 5 processor or greater versus a Pentium® 4 processor.

Figure 2C:
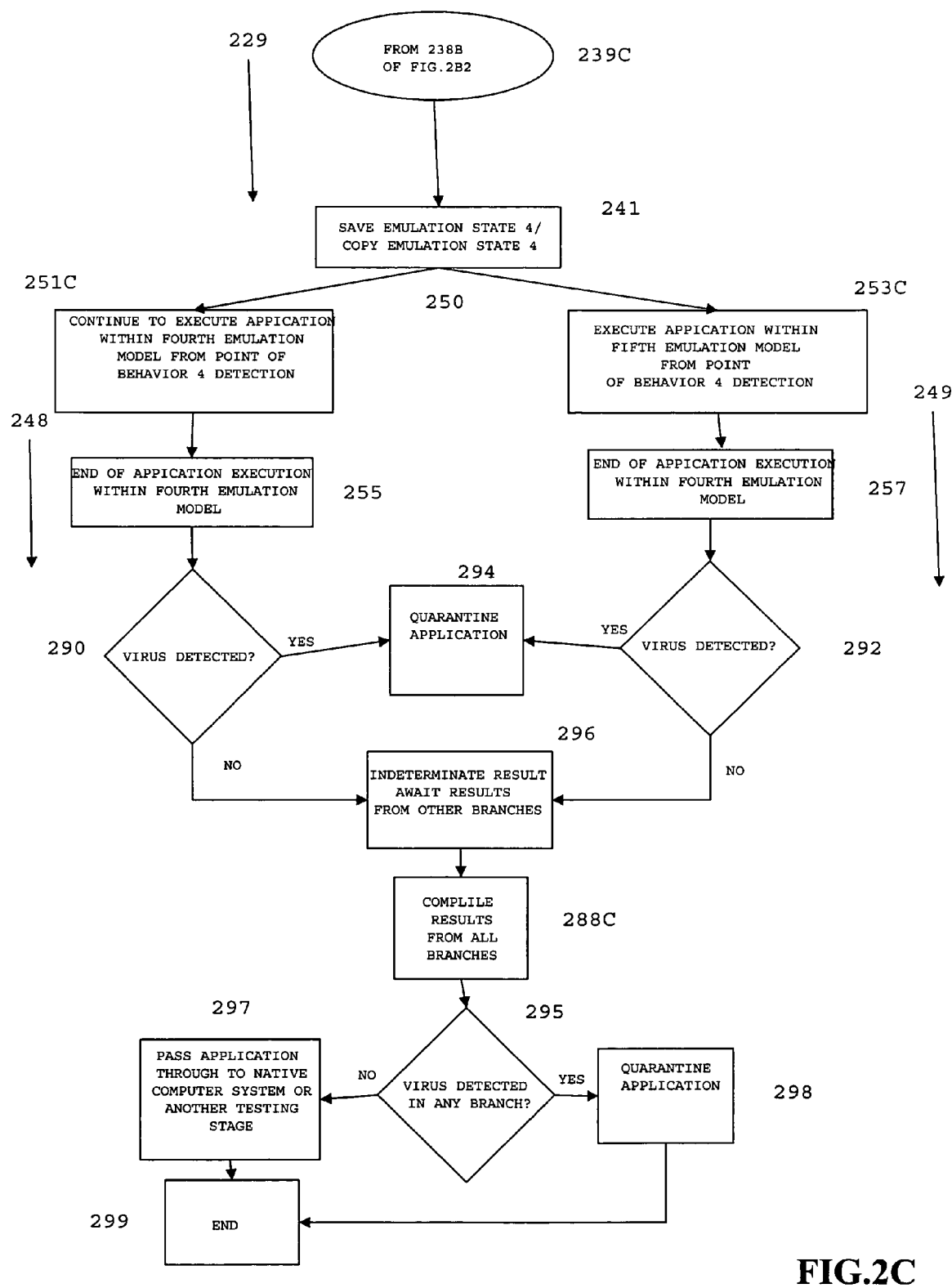

In one embodiment, from DETECT VARIABLE BEHAVIOR 4 OPERATION 237 process flow passes through PROCEED TO 239C OF FIG. 2C PORT 238B, to FIG. 2C, trough FROM 238B OF FIG. 2B2 PORT 239C, to SAVE EMULATION STATE 4/COPY EMULATION STATE 4 OPERATION 241.

At SAVE EMULATION STATE 4/COPY EMULATION STATE 4 OPERATION 241, the data associated with the fourth emulation model state in EXECUTE APPLICATION WITHIN FOURTH EMULATION MODEL FROM POINT OF BEHAVIOR 3 DETECTION OPERATION 233B, up to the point of fourth version variable behavior detection at DETECT VARIABLE BEHAVIOR 4 237, i.e., up to branch point 250, is saved and a copy of the data indicating the fourth emulation model state in EXECUTE APPLICATION WITHIN FOURTH EMULATION MODEL FROM POINT OF BEHAVIOR 3 DETECTION OPERATION 233B, up to branch point 250, is generated.

In one embodiment, the various data associated with the fourth emulation model state in EXECUTE APPLICATION WITHIN FOURTH EMULATION MODEL FROM POINT OF BEHAVIOR 3 DETECTION OPERATION 233B, up to the point fourth version variable behavior detection at DETECT VARIABLE BEHAVIOR 4 237, i.e., up to branch point 250, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory, mass memory, or the like, associated with a computer system, such as computer systems 100, 151, described above. In one embodiment, the data, in whole, or in part, is stored in any computer system and/or server system, such as computer systems 100, 151, or server system 120, or other device, in another location, or on/in computer readable medium, and/or any other computer program product, as defined herein. In one embodiment, the data, in whole, or in part, is stored on a webpage or in a web-based system.

Once the fourth emulation model state at branch point 250 is saved and copied at SAVE EMULATION STATE 4/COPY EMULATION STATE 4 OPERATION 241, process flow splits again into two branches, behavior 4 branch 248 and behavior 5 branch 249. In one embodiment, behavior 4 branch 248 proceeds to CONTINUE TO EXECUTE APPLICATION WITHIN FOURTH EMULATION MODEL FROM POINT OF BEHAVIOR 4 DETECTION OPERATION 251C. At CONTINUE TO EXECUTE APPLICATION WITHIN FOURTH EMULATION MODEL FROM POINT OF BEHAVIOR 4 DETECTION OPERATION 251C, the suspect application continues to be executed as it was in EXECUTE APPLICATION WITHIN FOURTH EMULATION MODEL FROM POINT OF BEHAVIOR 3 DETECTION OPERATION 233B. In one embodiment, execution of the suspect application continues at CONTINUE TO EXECUTE APPLICATION WITHIN FOURTH EMULATION MODEL FROM POINT OF BEHAVIOR 4 DETECTION OPERATION 251C, up to the point where a fifth version variable behavior, if present, is detected.

In this one specific illustrative example, it is presupposed that there are no more version variable behaviors detected within the fourth emulation model branch of CONTINUE TO EXECUTE APPLICATION WITHIN FOURTH EMULATION MODEL FROM POINT OF BEHAVIOR 4 DETECTION OPERATION 251C and process flow proceeds, in this particular example, to END OF APPLICATION EXECUTION WITHIN FOURTH EMULATION MODEL OPERATION 255. At END OF APPLICATION EXECUTION WITHIN FOURTH EMULATION MODEL OPERATION 255, the suspect application is executed either to completion, or as far as is deemed necessary. Once the suspect application is done executing, process flow proceeds to VIRUS DETECTED? OPERATION 290.

At VIRUS DETECTED? OPERATION 290, a determination is made as to whether any of the code decrypted by the suspect application thus far is malevolent, or virus, code. If it is determined that the suspect application did include virus code at VIRUS DETECTED? OPERATION 290, i.e., a YES result is obtained at VIRUS DETECTED? OPERATION 290, then the suspect application is quarantined at QUARANTINE APPLICATION OPERATION 294, and thereby prevented from executing on the native computer system.

If, on the other hand, it is determined that the suspect application did not include any virus code at VIRUS DETECTED? OPERATION 290, i.e., a NO result is obtained at VIRUS DETECTED? OPERATION 290, then the results are considered indeterminate since only the behavior 4 branch results are available and the process flow proceeds to INDETERMINATE RESULT/AWAIT RESULTS FROM OTHER BRANCHES OPERATION 296. From INDETERMINATE RESULT/AWAIT RESULTS FROM OTHER BRANCHES OPERATION 296, process flow moves, in this example, to COMPILE RESULTS FROM ALL BRANCHES OPERATION 288C, where the results of the behavior 4 branch, including behavior 2 branch 215, behavior 2 branch 215, behavior 4 branch 229, and behavior 4 branch 248, of process for ambiguous-state support in virtual machine emulators 200 wait to be added to the results of the other branches.

Recall that at branch point 250 and SAVE EMULATION STATE 4/COPY EMULATION STATE 4 OPERATION 241, the data associated with the fourth emulation model state in EXECUTE APPLICATION WITHIN FOURTH EMULATION MODEL FROM POINT OF BEHAVIOR 3 DETECTION OPERATION 233B, up to the point of fourth version variable behavior detection, branch point 250, at DETECT VARIABLE BEHAVIOR 4 OPERATION 237, was saved and a copy of the data indicating the fourth emulation model state in EXECUTE APPLICATION WITHIN FOURTH EMULATION MODEL FROM POINT OF BEHAVIOR 3 DETECTION OPERATION 233B, up to branch point 250, was generated and process for ambiguous-state support in virtual machine emulators 200 split into two branches, behavior 4 branch 248 and behavior 5 branch 249. Once the copy of the fourth emulation model state up to branch point 250 is made at SAVE EMULATION STATE 4/COPY EMULATION STATE 4 OPERATION 241, behavior 5 branch 249 of process for ambiguous-state support in virtual machine emulators 200 proceeds to EXECUTE APPLICATION WITH FIFTH EMULATION MODEL FROM POINT OF BEHAVIOR 4 DETECTION OPERATION 253C. At EXECUTE APPLICATION WITH FIFTH EMULATION MODEL FROM POINT OF BEHAVIOR 4 DETECTION OPERATION 253C, the suspect application is executed in a fifth emulation model, by either a modified version of the same virtual machine emulator, or emulation model, of EXECUTE APPLICATION WITHIN FOURTH EMULATION MODEL FROM POINT OF BEHAVIOR 3 DETECTION OPERATION 233B, or by a separate virtual machine emulator, or emulation model, entirely. In one embodiment, the suspect application is executed in the fifth emulation model only from the point of fourth version variable behavior detection, i.e., point 250, while all the core, second and fourth emulation model behavior from core, second and fourth emulation model states of EXECUTE APPLICATION WITHIN FIRST EMULATION MODEL OPERATION 207, EXECUTE APPLICATION WITHIN SECOND EMULATION MODEL FROM POINT OF BEHAVIOR 1 DETECTION OPERATION 213A and EXECUTE APPLICATION WITHIN FOURTH EMULATION MODEL FROM POINT OF BEHAVIOR 3 DETECTION OPERATION 233B, up to branch point 250, is simply copied and incorporated, not re-executed. This is in direct contrast to the highly redundant, and inefficient, prior art anti-virus systems and methods discussed above, where a complete emulation would be run for each branch, including multiple runs of all the common non-variable behaviors, from beginning to end.

Those of skill in the art will recognize that, in one embodiment, behavior 4 branch 248 and behavior 5 branch 249 of process for ambiguous-state support in virtual machine emulators 200 can be performed simultaneously by two virtual machine emulators, or emulation models, on either separate threads of a multi-threaded processor, or through the use dual processors, redundant systems, or data sharing models. In other embodiments, each branch 248 and 249 of process for ambiguous-state support in virtual machine emulators 200 is run, in whole, or in part, sequentially.

In one embodiment, the suspect application continues to be executed at EXECUTE APPLICATION WITH FIFTH EMULATION MODEL FROM POINT OF VARIABLE 4 BEHAVIOR DETECTION OPERATION 253C up to the point where a fifth version variable behavior, if present, is detected.

In this one specific illustrative example, it is presupposed that there are no more version variable behaviors detected within the fifth emulation model of EXECUTE APPLICATION WITH FIFTH EMULATION MODEL OPERATION 253C and process flow proceeds, in this particular example, to END OF APPLICATION EXECUTION WITHIN FIFTH EMULATION MODEL OPERATION 257. At END OF APPLICATION EXECUTION WITHIN FIFTH EMULATION MODEL OPERATION 257, the suspect application is executed either to completion, or as far as is deemed necessary. Once the suspect application is done executing, process flow proceeds to VIRUS DETECTED? OPERATION 292.

At VIRUS DETECTED? OPERATION 292, a determination is made as to whether any of the code decrypted by the suspect application is malevolent, or virus, code. If it is determined that the suspect application did include virus code at VIRUS DETECTED? OPERATION 292, i.e., a YES result is obtained at VIRUS DETECTED? OPERATION 292, then the suspect application is quarantined at QUARANTINE APPLICATION OPERATION 294, and thereby prevented from executing on the native computer system.

If, on the other hand, it is determined that the suspect application did not include any virus code at VIRUS DETECTED? OPERATION 292, i.e., a NO result is obtained at VIRUS DETECTED? OPERATION 292, then the results are considered indeterminate since only the behavior 5 branch results are available and the process flow proceeds to INDETERMINATE RESULT/AWAIT RESULTS FROM OTHER BRANCHES OPERATION 296. From INDETERMINATE RESULT/AWAIT RESULTS FROM OTHER BRANCHES OPERATION 296, process flow moves, in this example, to COMPILE RESULTS FROM ALL BRANCHES OPERATION 288C, where the results of the behavior 4 branch, including behavior 2 branch 215, behavior 2 branch 215, behavior 4 branch 229, and behavior 5 branch 249, of process for ambiguous-state support in virtual machine emulators 200 wait to be added to the results of the other branches.

In this particular example, at COMPILE RESULTS FROM ALL BRANCHES OPERATION 288C, the results from all the branches of process for ambiguous-state support in virtual machine emulators 200 are gathered and process flow proceeds to VIRUS DETECTED IN ANY BRANCH? OPERATION 295.

At VIRUS DETECTED IN ANY BRANCH? OPERATION 295, a determination is made as to whether any of the code decrypted by the suspect application is malevolent, or virus, code. If it is determined that the suspect application did include virus code at DETECTED IN ANY BRANCH? OPERATION 295, i.e., a YES result is obtained at VIRUS DETECTED IN ANY BRANCH? OPERATION 295, then the suspect application is quarantined at QUARANTINE APPLICATION OPERATION 298, and thereby prevented from executing on the native computer system, and process for ambiguous-state support in virtual machine emulators 200 is exited at END OPERATION 299.

If, on the other hand, it is determined that the suspect application did not include any virus code at VIRUS DETECTED IN ANY BRANCH? OPERATION 295, i.e., a NO result is obtained at VIRUS DETECTED IN ANY BRANCH? OPERATION 295, then process flow proceeds to PASS APPLICATION THROUGH TO NATIVE COMPUTER SYSTEM OR ANOTHER TESTING STAGE OPERATION 297 and process for ambiguous-state support in virtual machine emulators 200 is exited at END OPERATION 299.

The one specific illustrative example discussed above with respect to FIG. 2A, 2B1, 2B2, and 2C was used for illustrative purposes only. Those of skill in the art will readily recognize this fact. In particular, in the specific example discussed above, four different branches were illustrated, at specific illustrative points of version variable behavior detection, to provide one specific illustrative example of the operation of a process for ambiguous-state support in virtual machine emulators, such as process for ambiguous-state support in virtual machine emulators 200. However, in other examples of an implementation of a process for ambiguous-state support in virtual machine emulators, such as process for ambiguous-state support in virtual machine emulators 200, there could be an almost infinite variation of the number of branches, and the occurrences of those branches. Consequently, the specific example discussed above in no way limits the scope of the invention to any particular configuration or working example.

A specific illustrative example of the operation of a process for ambiguous-state support in virtual machine emulators, such as process for ambiguous-state support in virtual machine emulators 200, will now be discussed where a process for ambiguous-state support in virtual machine emulators, such as process for ambiguous-state support in virtual machine emulators 200, is used in a hypothetical context where the computer system component creating the ambiguous-state, i.e., having multiple variations, versions, or generations possible, is a processor, and in particular, a Pentium® series processor.

Those of skill in the art will readily recognize that while the specific example below involves a Pentium® processor, any processor or integrated circuit device or product line having more than one variation, version, or generation, possible, such as any AMD processors, any SPARC processors from Sun Microsystems, or any other line of processors from any manufacturer or supplier, could be accommodated by a process for ambiguous-state support in virtual machine emulators, such as process for ambiguous-state support in virtual machine emulators 200, and the example would run similarly in its essential components.

In addition, those of skill in the art will readily recognize that while the specific example below involves a processor, as discussed above, it is envisioned, and expected, that a process for ambiguous-state support in virtual machine emulators, such as process for ambiguous-state support in virtual machine emulators 200, will also be used in situations where the computer system component creating the ambiguous-state, i.e., having multiple variations, versions, or generations possible, is an operating system, or a patch and/or update, or a memory size or configuration, or any computer system component where a specific instruction, memory request, flag, operation, or action on the part of a suspect application is indicative of a particular version, variation, or generation of the computer system component.

In this example we will assume a native computer system, such as computer systems 100, 150, 120 of FIG. 1, includes a Pentium® 5 processor and that a process for ambiguous-state support in virtual machine emulators, such as process for ambiguous-state support in virtual machine emulators 200, is being employed to protect the native computer system.

Referring to FIG. 2A, process for ambiguous-state support in virtual machine emulators 200 begins at ENTER OPERATION 201. From ENTER OPERATION 201 process flow proceeds to CREATE VIRTUAL MACHINE EMULATOR OPERATION 203. In this example, a Pentium® series of processor emulators, or emulation models, would be created at CREATE VIRTUAL MACHINE EMULATOR OPERATION 203 such as Pentium® 1, Pentium® 2 Pentium® 3 Pentium® 4 Pentium® 5, Pentium® 6 virtual machine emulators, or emulation models. As noted above, a virtual machine emulator typically is divided into modules that correspond roughly to the emulated computer's subsystems. Most often, a virtual machine emulator is composed of at least the following modules: a processor emulator or processor simulator (not shown); a memory subsystem module (not shown); and various I/O device emulators (not shown). The processor emulator is often the most complicated part of a virtual machine emulator. Many virtual machine emulators are written using "pre-packaged", i.e., hard-coded, processor emulators, such as, in this example, a Pentium®, Pentium® 1, Pentium® 2 Pentium® 3 Pentium® 4 Pentium® 5, Pentium® 6, version in order to concentrate on good and efficient emulation of a processor and/or processor version, variation, or generation.

As noted above, the methods of creation, structure, and operation of virtual machine emulators, or emulation models, is well known to those of skill in the art. Consequently, a more detailed discussion of the methods of creation, structure, and operation of virtual machine emulators, or emulation models, is omitted here to avoid detracting from the invention.

Once the virtual machine emulators, or emulation models, are created at CREATE VIRTUAL MACHINE EMULATOR OPERATION 203, process flow proceeds to RECEIVE APPLICATION OPERATION 205. At RECEIVE APPLICATION OPERATION 205, a suspect application is received to be run on the virtual machine emulator created at CREATE VIRTUAL MACHINE EMULATOR OPERATION 203. In one embodiment, all unknown applications, regardless of source, that attempt to access the native computer system's memory, such as memories 103 and 153 of computer systems 100 and 150 of FIG. 1, are considered suspect applications and are therefore sent to the virtual machine emulator before they are allowed to run on the native computer system, such as computer systems 100 and 150 of FIG. 1.

Once a suspect application is received at RECEIVE APPLICATION OPERATION 205, process flow proceeds to EXECUTE APPLICATION WITHIN FIRST EMULATION MODEL OPERATION 207. In this example, at EXECUTE APPLICATION WITHIN FIRST EMULATION MODEL OPERATION 207, the virtual machine emulator begins to execute the suspect application in the core Pentium® or Pentium® 1 behavior emulation model. As discussed above, using one embodiment of process for ambiguous-state support in virtual machine emulators 200, different versions, variations, or generations, such as Pentium®, Pentium® 1, Pentium® 2 Pentium® 3 Pentium® 4 Pentium® 5, Pentium® 6, are supported in a single emulation, i.e., in this example, the core Pentium® or Pentium® 1 emulation model of EXECUTE APPLICATION WITHIN FIRST EMULATION MODEL OPERATION 207.

In this example, process for ambiguous-state support in virtual machine emulators 200 continues in EXECUTE APPLICATION WITHIN FIRST EMULATION MODEL OPERATION 207 up to the point where version variable behavior is detected. Consequently, in this example, the core or non-variable Pentium® or Pentium® 1 behaviors that typically constitute the vast majority of behaviors associated with any given one of a Pentium® 1, Pentium® 2 Pentium® 3 Pentium® 4 Pentium® 5, Pentium® 6, generation processor are emulated in a single emulation up to the point where version variable behavior, if present, is detected.

In this example, we stipulate that a version variable behavior is detected at DETECT VARIABLE BEHAVIOR 1 OPERATION 208. In this example, the version variable behavior detected at DETECT VARIABLE BEHAVIOR 1 OPERATION 208 can be any behavior on the part of the suspect application that indicates the application must execute on a particular Pentium®, Pentium® 1, Pentium® 2 Pentium® 3 Pentium® 4 Pentium® 5, Pentium® 6, processor. The behavior itself may be a specific instruction, memory request, flag, or operation that is indicative of a particular version, variation, or generation of the computer system component.

In this example we will stipulate that specific processor flags set by an instruction issued/requested by the suspect application indicate that a Pentium® 3 or greater processor behavior is present versus a Pentium® 2 or less processor behavior.

Once the first version variable behavior, i.e., in this example, the Pentium® 3 or greater processor behavior, is detected, process flow proceeds to SAVE EMULATION STATE 1/COPY EMULATION STATE 1 OPERATION 209. At SAVE EMULATION STATE 1/COPY EMULATION STATE 1 OPERATION 209, the data associated with the Pentium® 1 emulation model state in EXECUTE APPLICATION WITHIN FIRST EMULATION MODEL OPERATION 207, up to the point of Pentium® 3 or greater processor behavior detection, branch point 210, at DETECT VARIABLE BEHAVIOR 1 OPERATION 208, is saved and a copy of the data indicating the Pentium® 1 emulation state in EXECUTE APPLICATION WITHIN FIRST EMULATION MODEL OPERATION 207, up to branch point 210, is generated.

Once the Pentium® 1 emulation state at branch point 210 is saved and copied at SAVE EMULATION STATE 1/COPY EMULATION STATE 1 OPERATION 209, process for ambiguous-state support in virtual machine emulators 200 splits, or branches, into two branches, core branch 214, in this example, the Pentium® 2 or less branch, and behavior 2 branch 215, in this example, the Pentium® 3 or greater branch. Core branch 214 proceeds to CONTINUE TO EXECUTE APPLICATION WITHIN FIRST EMULATION MODEL OPERATION 211A. At CONTINUE TO EXECUTE APPLICATION WITHIN FIRST EMULATION MODEL OPERATION 211A, the suspect application continues to be executed as it was, i.e., in this example, as a Pentium® 2 or less processor, in EXECUTE APPLICATION WITHIN FIRST EMULATION MODEL OPERATION 207. In one embodiment, execution of the suspect application continues at CONTINUE TO EXECUTE APPLICATION WITHIN FIRST EMULATION MODEL OPERATION 211A, up to the point where a second version variable behavior, if present, is detected. In short, in this example, the suspect application continues to be executed as a Pentium® 2 or less processor and process flow passes through PROCEED TO 216B OF FIG. 2B1 PORT 214A, to FIG. 2B1, through FROM 214A OF FIG. 2A PORT 216B to DETECT VARIABLE BEHAVIOR 2 OPERATION 218.

In this specific example, we will stipulate that a version variable behavior is detected at DETECT VARIABLE BEHAVIOR 2 OPERATION 218. In this example, we will further stipulate that specific processor flags set by an instruction issued/requested by the suspect application indicate that a Pentium® 2 processor versus a Pentium® 1 processor is required.

In this example, once the Pentium® 2 processor variable behavior is detected, process flow proceeds to SAVE EMULATION STATE 2/COPY EMULATION STATE 2 OPERATION 219. At SAVE EMULATION STATE 2/COPY EMULATION STATE 2 OPERATION 219, the data associated with the Pentium® 1 emulation model state in CONTINUE TO EXECUTE APPLICATION WITHIN FIRST EMULATION MODEL OPERATION 211A, up to the point where, in this example, the Pentium® 2 processor variable behavior was detected at DETECT VARIABLE BEHAVIOR 2 OPERATION 219, i.e., up to branch point 220, is saved and a copy of the data indicating the Pentium® 1 emulation model state in CONTINUE TO EXECUTE APPLICATION WITHIN FIRST EMULATION MODEL OPERATION 211A, up to branch point 220, is generated.

Once the Pentium® 1 emulation model state at branch point 220 is saved and copied at SAVE EMULATION STATE 2/COPY EMULATION STATE 2 OPERATION 219, process for ambiguous-state support in virtual machine emulators 200 splits, or branches, again into two branches, core branch 222, in this example, the Pentium® 1 branch, and behavior 3 branch 223, in this example, the Pentium® 2 branch. Core branch 222 proceeds to CONTINUE TO EXECUTE APPLICATION WITHIN FIRST EMULATION MODEL OPERATION 221B. In this example, at CONTINUE TO EXECUTE APPLICATION WITHIN FIRST EMULATION MODEL OPERATION 221B, the suspect application continues to be executed as a Pentium® 1 processor as it was in CONTINUE TO EXECUTE APPLICATION WITHIN FIRST EMULATION MODEL OPERATION 211A and EXECUTE APPLICATION WITHIN FIRST EMULATION MODEL OPERATION 207. In one embodiment, execution of the suspect application continues at CONTINUE TO EXECUTE APPLICATION WITHIN FIRST EMULATION MODEL OPERATION 221B, up to the point where a third version variable behavior, if present, is detected.

In this one specific example, it is stipulated that there are no more version variable behaviors detected within, in this example, the Pentium® 1 behavior emulation model of CONTINUE TO EXECUTE APPLICATION WITHIN FIRST EMULATION MODEL OPERATION 221B and process flow proceeds, in this particular example, to END OF APPLICATION EXECUTION WITHIN FIRST EMULATION MODEL OPERATION 224. At END OF APPLICATION EXECUTION WITHIN FIRST EMULATION MODEL OPERATION 224, the suspect application is executed either to completion, or as far as deemed necessary. Once the suspect application is done executing, process flow proceeds to VIRUS DETECTED? OPERATION 280.

At VIRUS DETECTED? OPERATION 280, a determination is made as to whether any of the code decrypted by the suspect application thus far is malevolent, or virus, code. If it is determined that the suspect application did include virus code at VIRUS DETECTED? OPERATION 280, i.e., a YES result is obtained at VIRUS DETECTED? OPERATION 280, then the suspect application is quarantined at QUARANTINE APPLICATION OPERATION 284, and thereby prevented from executing on the native computer system.

If, on the other hand, it is determined that the suspect application did not include any virus code at VIRUS DETECTED? OPERATION 280, i.e., a NO result is obtained at VIRUS DETECTED? OPERATION 280, then the results are considered indeterminate since only the Pentium® 1 branch results are available and the process flow proceeds to INDETERMINATE RESULT/AWAIT RESULTS FROM OTHER BRANCHES OPERATION 286. From INDETERMINATE RESULT/AWAIT RESULTS FROM OTHER BRANCHES OPERATION 286, process flow moves, in this example, to GO TO COMPILE RESULTS FROM ALL BRANCHES OPERATION 288C OF FIG. 2C OPERATION 288B1, where the results of the Pentium® 1 branch of process for ambiguous-state support in virtual machine emulators 200 wait to be added to the results of the other branches.

Returning to branch point 220 of FIG. 2B1, recall that at branch point 220 and SAVE EMULATION STATE 2/COPY EMULATION STATE 2 OPERATION 219, the data associated with the Pentium® 1 emulation model state in CONTINUE TO EXECUTE APPLICATION WITHIN FIRST EMULATION MODEL OPERATION 211A, up to the point where, in this example, the Pentium® 2 behavior was detected at DETECT VARIABLE BEHAVIOR 2 OPERATION 219, i.e., branch point 220, was saved and a copy of the data indicating the Pentium® 1 emulation model state in CONTINUE TO EXECUTE APPLICATION WITHIN FIRST EMULATION MODEL OPERATION 211A, up to branch point 220, was generated and process for ambiguous-state support in virtual machine emulators 200 split into two branches, core branch 222, in this example, the Pentium® 1 branch, and behavior 3 branch 223, in this example, the Pentium® 2 branch. Once the copy of the emulation state up to branch point 220 is made at SAVE EMULATION STATE 2/COPY EMULATION STATE 2 OPERATION 219, behavior 3 branch 223, in this example, the Pentium® 2 branch, of process for ambiguous-state support in virtual machine emulators 200 proceeds to EXECUTE APPLICATION WITHIN THIRD EMULATION MODEL FROM POINT OF BEHAVIOR 2 DETECTION OPERATION 223B.

At EXECUTE APPLICATION WITH THIRD EMULATION MODEL FROM POINT OF BEHAVIOR 2 DETECTION OPERATION 223B, the copy of the Pentium® 1 emulation model state in CONTINUE TO EXECUTE APPLICATION WITHIN FIRST EMULATION MODEL OPERATION 211A, up to branch point 220, in this example, where Pentium® 2 behavior was detected at DETECT VARIABLE BEHAVIOR 2 218, from SAVE EMULATION STATE 2/COPY EMULATION STATE 2 OPERATION 219, is incorporated and the suspect application is executed, in this example, in a Pentium® 2 emulation model, by either a modified version of the Pentium® 1 virtual machine emulator of EXECUTE APPLICATION WITHIN FIRST EMULATION MODEL OPERATION 207, or by a separate virtual machine emulator entirely. In one embodiment, the suspect application is executed, in this example, in Pentium® 2 emulation model only from the point where the Pentium® 2 behavior was detected, i.e., point 220, while all the Pentium® core behavior from the Pentium® 1 emulation model state in EXECUTE APPLICATION WITHIN FIRST EMULATION MODEL OPERATION 207 and CONTINUE TO EXECUTE APPLICATION WITHIN FIRST EMULATION MODEL OPERATION 211A, up to branch point 220, is simply copied and incorporated, not re-executed. This is in direct contrast to the highly redundant, and inefficient, prior art anti-virus systems and methods discussed above, where a complete emulation would be run, in this example, for both the Pentium® 1 and Pentium® 2 generations, including multiple runs of all the common non-variable behaviors, from beginning to end.

In one embodiment, execution of the suspect application continues at EXECUTE APPLICATION WITH THIRD EMULATION MODEL FROM POINT OF BEHAVIOR 2 DETECTION OPERATION 223B, up to the point where a third version variable behavior, if present, is detected.

In this one specific example, it is stipulated that there are no more version variable behaviors detected within, in this example, the Pentium® 2 branch, including core behavior branch 214 and behavior 3 branch 223, of process for ambiguous-state support in virtual machine emulators 200 and process flow proceeds, in this particular example, to END OF APPLICATION EXECUTION WITHIN THIRD EMULATION MODEL OPERATION 226. At END OF APPLICATION EXECUTION WITHIN THIRD EMULATION MODEL OPERATION 226, the suspect application is executed either to completion, or as far as deemed necessary. Once the suspect application is done executing, process flow proceeds to VIRUS DETECTED? OPERATION 282.

At VIRUS DETECTED? OPERATION 282, a determination is made as to whether any of the code decrypted by the suspect application thus far is malevolent, or virus, code. If it is determined that the suspect application did include virus code at VIRUS DETECTED? OPERATION 282, i.e., a YES result is obtained at VIRUS DETECTED? OPERATION 282, then the suspect application is quarantined at QUARANTINE APPLICATION OPERATION 284, and thereby prevented from executing on the native computer system.

If, on the other hand, it is determined that the suspect application did not include any virus code at VIRUS DETECTED? OPERATION 282, i.e., a NO result is obtained at VIRUS DETECTED? OPERATION 282, then the results are considered indeterminate since only the Pentium® 3 branch results are available and the process flow proceeds to INDETERMINATE RESULT/AWAIT RESULTS FROM OTHER BRANCHES OPERATION 286. From INDETERMINATE RESULT/AWAIT RESULTS FROM OTHER BRANCHES OPERATION 286, process flow moves, in this example, to GO TO COMPILE RESULTS FROM ALL BRANCHES OPERATION 288C OF FIG. 2C OPERATION 288B1, where the results of the Pentium® 3 branch of process for ambiguous-state support in virtual machine emulators 200 wait to be added to the results of the other branches.

Returning to branch point 210 and FIG. 2A, recall that at branch point 210 and SAVE EMULATION STATE 1/COPY EMULATION STATE 1 OPERATION 209, the data associated with the Pentium® 1 emulation model state in EXECUTE APPLICATION WITHIN FIRST EMULATION MODEL OPERATION 207, up to the point, branch point 210, in this example, where the Pentium® 3 or greater behavior was detected at DETECT VARIABLE BEHAVIOR 1 OPERATION 208, was saved and a copy of the data indicating the Pentium® 1 emulation model state in EXECUTE APPLICATION WITHIN FIRST EMULATION MODEL OPERATION 207 up to branch point 210, was generated and process for ambiguous-state support in virtual machine emulators 200 split into two branches, core branch 214, in this example, the Pentium® 1 branch, and behavior 2 branch 215, in this example, the Pentium® 3 or greater branch. Once the copy of the Pentium® 1 emulation model state up to branch point 210 is made at SAVE EMULATION STATE 1/COPY EMULATION STATE 1 OPERATION 209, behavior 2 branch 215 of process for ambiguous-state support in virtual machine emulators 200 proceeds to EXECUTE APPLICATION WITH SECOND EMULATION MODEL FROM POINT OF BEHAVIOR 1 DETECTION OPERATION 213A. At EXECUTE APPLICATION WITHIN SECOND EMULATION MODEL FROM POINT OF BEHAVIOR 1 DETECTION OPERATION 213A, the suspect application is executed, in this example, in a Pentium® 3 or greater emulation model, by either a modified version of the Pentium® 1 virtual machine emulator of EXECUTE APPLICATION WITHIN FIRST EMULATION MODEL OPERATION 207, or by a separate virtual machine emulator, or emulation model, entirely.

In one embodiment, the suspect application continues to be executed, in this example, in the Pentium® 3 or greater emulation model at EXECUTE APPLICATION WITHIN SECOND EMULATION MODEL FROM POINT OF BEHAVIOR 1 DETECTION OPERATION 213A and process flow passes through PROCEED TO 217B OF FIG. 2B2 PORT 215A, to FIG. 2B2, through FROM 215A OF FIG. 2A PORT 217B to DETECT VARIABLE BEHAVIOR 3 OPERATION 225.

In this one specific illustrative example, we stipulate that a version variable behavior is detected at DETECT VARIABLE BEHAVIOR 3 OPERATION 225. In this example we will further stipulate that specific processor flags set by an instruction issued/requested by the suspect application indicate a Pentium® 4 or greater versus a Pentium® 3 processor.

In this example, once the Pentium® 4 or greater behavior is detected, process flow proceeds to SAVE EMULATION STATE 3/COPY EMULATION STATE 3 OPERATION 227. At SAVE EMULATION STATE 3/COPY EMULATION STATE 3 OPERATION 227, the data associated with the Pentium® 3 emulation model state in EXECUTE APPLICATION WITHIN SECOND EMULATION MODEL FROM POINT OF BEHAVIOR 1 DETECTION OPERATION 213A, up to the point where, in this example, the Pentium® 4 or greater behavior was detected at DETECT VARIABLE BEHAVIOR 3 OPERATION 225, i.e., up to branch point 230, is saved and a copy of the data indicating the Pentium® 3 emulation model state in EXECUTE APPLICATION WITHIN SECOND EMULATION MODEL FROM POINT OF BEHAVIOR 1 DETECTION OPERATION 213A, up to branch point 230, is generated.

Once the Pentium® 3 emulation model state at branch point 230 is saved and copied at SAVE EMULATION STATE 3/COPY EMULATION STATE 3 OPERATION 227, process for ambiguous-state support in virtual machine emulators 200 splits, or branches, again into two branches, behavior 2 branch 228, in this example, the Pentium® 3 branch, and behavior 4 branch 229, in this example, the Pentium® 4 or greater branch. Behavior 2 branch 228 proceeds to CON- TINUE TO EXECUTE APPLICATION WITHIN SECOND EMULATION MODEL FROM POINT OF VARIABLE BEHAVIOR 3 DETECTION OPERATION 231B. At CONTINUE TO EXECUTE APPLICATION WITHIN SECOND EMULATION MODEL FROM POINT OF VARIABLE BEHAVIOR 3 DETECTION OPERATION 231B, the suspect application continues to be executed, in this example, in a Pentium® 3 emulation model, as it was in EXECUTE APPLICATION WITHIN SECOND EMULATION MODEL FROM POINT OF BEHAVIOR 1 DETECTION OPERATION 213A. In one embodiment, execution of the suspect application continues at CONTINUE TO EXECUTE APPLICATION WITHIN SECOND EMULATION MODEL FROM POINT OF VARIABLE BEHAVIOR 3 DETECTION OPERATION 231B, up to the point where a third version variable behavior, if present, is detected.

In this one specific illustrative example, it is stipulated that there are no more version variable behaviors detected within, in this example, the Pentium® 3 emulation model of CONTINUE TO EXECUTE APPLICATION WITHIN SECOND EMULATION MODEL FROM POINT OF VARIABLE BEHAVIOR 3 DETECTION OPERATION 231B and process flow proceeds, in this particular example, to END OF APPLICATION EXECUTION WITHIN SECOND EMULATION MODEL OPERATION 235. At END OF APPLICATION EXECUTION WITHIN SECOND EMULATION MODEL OPERATION 235, the suspect application is executed either to completion, or as far as deemed necessary. Once the suspect application is done executing, process flow proceeds to VIRUS DETECTED? OPERATION 281.

At VIRUS DETECTED? OPERATION 281, a determination is made as to whether any of the code decrypted by the suspect application thus far is malevolent, or virus, code. If it is determined that the suspect application did include virus code at VIRUS DETECTED? OPERATION 281, i.e., a YES result is obtained at VIRUS DETECTED? OPERATION 281, then the suspect application is quarantined at QUARANTINE APPLICATION OPERATION 285, and thereby prevented from executing on the native computer system.

If, on the other hand, it is determined that the suspect application did not include any virus code at VIRUS DETECTED? OPERATION 281, i.e., a NO result is obtained at VIRUS DETECTED? OPERATION 281, then the results are considered indeterminate since only the Pentium® 2 branch results are available and the process flow proceeds to INDETERMINATE RESULT/AWAIT RESULTS FROM OTHER BRANCHES OPERATION 283. From INDETERMINATE RESULT/AWAIT RESULTS FROM OTHER BRANCHES OPERATION 283, process flow moves, in this example, to GO TO COMPILE RESULTS FROM ALL BRANCHES OPERATION 288C OF FIG. 2C OPERATION 288B2, where the results of the Pentium® 2 branch of process for ambiguous-state support in virtual machine emulators 200 wait to be added to the results of the other branches.

Returning to branch point 230, recall that at branch point 230 and SAVE EMULATION STATE 3/COPY EMULATION STATE 3 OPERATION 227, the data associated with the Pentium® 3 emulation model state in EXECUTE APPLICATION WITHIN SECOND EMULATION MODEL FROM POINT OF BEHAVIOR 1 DETECTION OPERATION 213A, up to the point, branch point 230, where, in this example, Pentium® 4 or greater variable behavior was detected at DETECT VARIABLE BEHAVIOR 3 OPERATION 225, was saved and a copy of the data indicating the Pentium® 3 emulation model state in EXECUTE APPLICATION WITHIN SECOND EMULATION MODEL FROM POINT OF BEHAVIOR 1 DETECTION OPERATION 213A, up to branch point 230, was generated and process for ambiguous-state support in virtual machine emulators 200 split, or branched, again into two branches, behavior 2 branch 228, in this example, the Pentium® 3 branch, and behavior 4 branch 229, in this example, Pentium® 4 or greater branch. Once the copy of the Pentium® 3 emulation model state up to branch point 230 is made at SAVE EMULATION STATE 3/COPY EMULATION STATE 3 OPERATION 227, behavior 4 branch 229 of process for ambiguous-state support in virtual machine emulators 200 proceeds to EXECUTE APPLICATION WITHIN FOURTH EMULATION MODEL FROM POINT OF BEHAVIOR 3 DETECTION OPERATION 233B. At EXECUTE APPLICATION WITHIN FOURTH EMULATION MODEL FROM POINT OF BEHAVIOR 3 DETECTION OPERATION 233B, the suspect application is executed in a Pentium® 4 or greater emulation model, by either a modified version of the Pentium® 3 virtual machine emulator, or emulation model, of EXECUTE APPLICATION WITHIN SECOND EMULATION MODEL FROM POINT OF BEHAVIOR 1 DETECTION OPERATION 213A, or by a separate virtual machine emulator, or emulation model, entirely. In one embodiment, the suspect application is executed, in this example, in Pentium® 4 emulation model only from the point where the Pentium® 4 behavior was detected, i.e., point 230, while all the Pentium® 1 and Pentium® 3 behavior from the Pentium® 1 and Pentium® 3 emulation model states in EXECUTE APPLICATION WITHIN FIRST EMULATION MODEL OPERATION 207 and EXECUTE APPLICATION WITHIN SECOND EMULATION MODEL FROM POINT OF BEHAVIOR 1 DETECTION OPERATION 213A up to branch point 230, is simply copied and incorporated, not re-executed. This is in direct contrast to the highly redundant, and inefficient, prior art anti-virus systems and methods discussed above, where a complete emulation would be run, in this example, for both the Pentium® 3 and Pentium® 4 generations, including multiple runs of all the common non-variable behaviors, from beginning to end.

In this one specific illustrative example, we will stipulate that a version variable behavior is detected at DETECT VARIABLE BEHAVIOR 4 OPERATION 237. We will further stipulate that, in this example, specific processor flags set by an instruction issued/requested by the suspect application indicate that a Pentium® 5 or greater versus a Pentium® 4 processor is requested.

In one embodiment, from DETECT VARIABLE BEHAVIOR 4 OPERATION 237 process flow passes through PROCEED TO 239C OF FIG. 2C PORT 238B, to FIG. 2C, through FROM 238B OF FIG. 2B2 PORT 239C, to SAVE EMULATION STATE 4/COPY EMULATION STATE 4 OPERATION 241.

At SAVE EMULATION STATE 4/COPY EMULATION STATE 4 OPERATION 241, the data associated with the Pentium® 4 emulation model state in EXECUTE APPLICATION WITHIN FOURTH EMULATION MODEL FROM POINT OF BEHAVIOR 3 DETECTION OPERATION 233B, up to the point where, in this example, the Pentium® 5 or greater behavior is detected at DETECT VARIABLE BEHAVIOR 4 237, i.e., up to branch point 250, is saved and a copy of the data indicating the Pentium® 4 emulation model state in EXECUTE APPLICATION WITHIN FOURTH EMULATION MODEL FROM POINT OF BEHAVIOR 3 DETECTION OPERATION 233B, up to branch point 250, is generated.

Once the Pentium® 4 emulation model state at branch point 250 is saved and copied at SAVE EMULATION STATE 4/COPY EMULATION STATE 4 OPERATION 241, process flow splits again into two branches, behavior 4 branch 248, in this example, the Pentium® 4 branch, and behavior 5 branch 249, in this example, the Pentium® 5 or greater branch. In one embodiment, behavior 4 branch 248 proceeds to CONTINUE TO EXECUTE APPLICATION WITHIN FOURTH EMULATION MODEL FROM POINT OF BEHAVIOR 4 DETECTION OPERATION 251C. At CONTINUE TO EXECUTE APPLICATION WITH THIRD EMULATION MODEL FROM POINT OF BEHAVIOR 3 DETECTION OPERATION 251C, the suspect application continues to be executed as it was in EXECUTE APPLICATION WITHIN FOURTH EMULATION MODEL FROM POINT OF BEHAVIOR 3 DETECTION OPERATION 233B, i.e., in this example, in a Pentium® 4 emulation model. In one embodiment, execution of the suspect application continues at CONTINUE TO EXECUTE APPLICATION WITHIN FOURTH EMULATION MODEL FROM POINT OF BEHAVIOR 4 DETECTION OPERATION 251C, up to the point where a fifth version variable behavior, if present, is detected.

In this one specific illustrative example, it is stipulated that there are no more version variable behaviors detected within, in this example, the Pentium® 4 emulation model of CONTINUE TO EXECUTE APPLICATION WITHIN FOURTH EMULATION MODEL FROM POINT OF BEHAVIOR 4 DETECTION OPERATION 251C and process flow proceeds, in this particular example, to END OF APPLICATION EXECUTION WITHIN FOURTH EMULATION MODEL OPERATION 255. At END OF APPLICATION EXECUTION WITHIN FOURTH EMULATION MODEL OPERATION 255, the suspect application is executed either to completion, or as far as deemed necessary. Once the suspect application is done executing, process flow proceeds to VIRUS DETECTED? OPERATION 290.

At VIRUS DETECTED? OPERATION 290, a determination is made as to whether any of the code decrypted by the suspect application thus far is malevolent, or virus, code. If it is determined that the suspect application did include virus code at VIRUS DETECTED? OPERATION 290, i.e., a YES result is obtained at VIRUS DETECTED? OPERATION 290, then the suspect application is quarantined at QUARANTINE APPLICATION OPERATION 294, and thereby prevented from executing on the native computer system.

If, on the other hand, it is determined that the suspect application did not include any virus code at VIRUS DETECTED? OPERATION 290, i.e., a NO result is obtained at VIRUS DETECTED? OPERATION 290, then the results are considered indeterminate since only the Pentium® 4 branch results are available and the process flow proceeds to INDETERMINATE RESULT/AWAIT RESULTS FROM OTHER BRANCHES OPERATION 296. From INDETERMINATE RESULT/AWAIT RESULTS FROM OTHER BRANCHES OPERATION 296, process flow moves, in this example, COMPILE RESULTS FROM ALL BRANCHES OPERATION 288C, where the results of the Pentium® 4 branch of process for ambiguous-state support in virtual machine emulators 200 wait to be added to the results of the other branches.

Recall that at branch point 250 and SAVE EMULATION STATE 4/COPY EMULATION STATE 4 OPERATION 241, the data associated with the Pentium® 4 emulation model state in EXECUTE APPLICATION WITHIN FOURTH EMULATION MODEL FROM POINT OF BEHAVIOR 3 DETECTION OPERATION 233B, up to the point, branch point 250, where, in this example, Pentium® 5 or greater behavior was detected at DETECT VARIABLE BEHAVIOR 4 OPERATION 237, was saved and a copy of the data indicating the Pentium® 4 emulation model state in EXECUTE APPLICATION WITHIN FOURTH EMULATION MODEL FROM POINT OF BEHAVIOR 3 DETECTION OPERATION 233B, up to branch point 250, was generated and process for ambiguous-state support in virtual machine emulators 200 split into two branches, behavior 4 branch 248, in this example, the Pentium® 4 branch and behavior 5 branch 249, in this example, the Pentium® 5 or greater branch. Once the copy of the emulation state up to branch point 250 is made at SAVE EMULATION STATE 4/COPY EMULATION STATE 4 OPERATION 241, behavior 5 branch 249 of process for ambiguous-state support in virtual machine emulators 200 proceeds to EXECUTE APPLICATION WITH FIFTH EMULATION MODEL FROM POINT OF BEHAVIOR 4 DETECTION OPERATION 253C. At EXECUTE APPLICATION WITH FIFTH EMULATION MODEL FROM POINT OF BEHAVIOR 4 DETECTION OPERATION 253C, the suspect application is, in this example, executed in a Pentium® 5 or greater emulation model, by either a modified version of the Pentium® 4 virtual machine emulator, or emulation model, of EXECUTE APPLICATION WITHIN FOURTH EMULATION MODEL FROM POINT OF BEHAVIOR 3 DETECTION OPERATION 233B, or by a separate virtual machine emulator, or emulation model, entirely. In one embodiment, the suspect application is executed, in this example, in Pentium® 5 emulation model only from the point where the Pentium® 5 behavior was detected, i.e., point 250, while all the Pentium® 1, Pentium® 3 and Pentium® 4 behavior from the Pentium® 1, Pentium® 3 and Pentium® 4 emulation model states in EXECUTE APPLICATION WITHIN FIRST EMULATION MODEL OPERATION 207, EXECUTE APPLICATION WITHIN SECOND EMULATION MODEL FROM POINT OF BEHAVIOR 1 DETECTION OPERATION 213A and EXECUTE APPLICATION WITHIN FOURTH EMULATION MODEL FROM POINT OF BEHAVIOR 3 DETECTION OPERATION 233B, up to branch point 250, is simply copied and incorporated, not re-executed. This is in direct contrast to the highly redundant, and inefficient, prior art anti-virus systems and methods discussed above, where a complete emulation would be run, in this example, for both the Pentium® 4 and Pentium® 5 generations, including multiple runs of all the common non-variable behaviors, from beginning to end.

In one embodiment, the suspect application continues to be executed at EXECUTE APPLICATION WITH FIFTH EMULATION MODEL FROM POINT OF VARIABLE 4 BEHAVIOR DETECTION OPERATION 253C up to the point where a fifth version variable behavior, if present, is detected.

In this one specific illustrative example, it is stipulated that there are no more version variable behaviors detected within, in this example, the Pentium® 5 or greater emulation model of EXECUTE APPLICATION WITH FIFTH EMULATION MODEL FROM POINT OF VARIABLE 4 BEHAVIOR DETECTION OPERATION 253C and process flow proceeds, in this particular example, to END OF APPLICATION EXECUTION WITHIN FIFTH EMULATION MODEL OPERATION 257. At END OF APPLICATION EXECUTION WITHIN FIFTH EMULATION MODEL OPERATION 257, the suspect application is executed either to completion, or as far as is deemed necessary. Once the suspect application is done executing, process flow proceeds to VIRUS DETECTED? OPERATION 292.

At VIRUS DETECTED? OPERATION 292, a determination is made as to whether any of the code decrypted by the suspect application is malevolent, or virus, code. If it is determined that the suspect application did include virus code at VIRUS DETECTED? OPERATION 292, i.e., a YES result is obtained at VIRUS DETECTED? OPERATION 292, then the suspect application is quarantined at QUARANTINE APPLICATION OPERATION 294, and thereby prevented from executing on the native computer system.

If, on the other hand, it is determined that the suspect application did not include any virus code at VIRUS DETECTED? OPERATION 292, i.e., a NO result is obtained at VIRUS DETECTED? OPERATION 292, then the results are considered indeterminate since only the Pentium® 5 branch results are available and the process flow proceeds to INDETERMINATE RESULT/AWAIT RESULTS FROM OTHER BRANCHES OPERATION 296. From INDETERMINATE RESULT/AWAIT RESULTS FROM OTHER BRANCHES OPERATION 296, process flow moves, in this example, to COMPILE RESULTS FROM ALL BRANCHES OPERATION 288C, where the results of the Pentium® 5 branch of process for ambiguous-state support in virtual machine emulators 200 wait to be added to the results of the other branches.

In this particular example, at COMPILE RESULTS FROM ALL BRANCHES OPERATION 288C, the results from all the branches of process for ambiguous-state support in virtual machine emulators 200 are gathered and process flow proceeds to VIRUS DETECTED IN ANY BRANCH? OPERATION 295.

At VIRUS DETECTED IN ANY BRANCH? OPERATION 295, a determination is made as to whether any of the code decrypted by the suspect application is malevolent, or virus, code. If it is determined that the suspect application did include virus code at DETECTED IN ANY BRANCH? OPERATION 295, i.e., a YES result is obtained at VIRUS DETECTED IN ANY BRANCH? OPERATION 295, then the suspect application is quarantined at QUARANTINE APPLICATION OPERATION 298, and thereby prevented from executing on the native computer system, and process for ambiguous-state support in virtual machine emulators 200 is exited at END OPERATION 299.

If, on the other hand, it is determined that the suspect application did not include any virus code at VIRUS DETECTED IN ANY BRANCH? OPERATION 295, i.e., a NO result is obtained at VIRUS DETECTED IN ANY BRANCH? OPERATION 295, then process flow proceeds to PASS APPLICATION THROUGH TO NATIVE COMPUTER SYSTEM OR ANOTHER TESTING STAGE OPERATION 297 and process for ambiguous-state support in virtual machine emulators 200 is exited at END OPERATION 299.

In the specific example shown above, using a process for ambiguous-state support in virtual machine emulators, such as process for ambiguous-state support in virtual machine emulators 200, the suspect application was exposed to emulation of all five processor generations, i.e., Pentium® 1, Pentium® 2 Pentium® 3 Pentium® 4 Pentium® 5, in a single iteration of a process for ambiguous-state support in virtual machine emulators, such as process for ambiguous-state support in virtual machine emulators 200. This is in stark contrast to the prior art anti-virus systems and methods that would have required at least five complete emulations, one for each generation of Pentium® 1, Pentium® 2 Pentium® 3 Pentium® 4 Pentium® 5, to run from beginning to end.

As discussed above, using one embodiment of a method and apparatus for ambiguous-state support in virtual machine emulators, as described herein, different versions, variations or generations of a given computer system component are supported in a single emulation, up to the point where version variable behavior is detected. Consequently, the core or non-variable behaviors that typically constitute the vast majority of behaviors of the set of behaviors associated with any given version, variation, or generation of a given computer component are emulated in a single emulation. Then, according to one embodiment, only the relatively few version variable behaviors associated with specific individual versions, variations, or generations of a given computer system component are run as separate, or version variable behavior branched, emulations. Consequently, according to one embodiment of a method and apparatus for ambiguous-state support in virtual machine emulators, as described herein, only one complete emulation is actually run, using minimal resources and time, while still providing protection for multiple versions, variations or generations of a given computer system component. This is in direct contrast to the highly redundant, and inefficient, prior art anti-virus systems and methods discussed above, where a complete emulation would be run for each version, variation, or generation of a given computer system component, for every behavior, including multiple runs of all the common non-variable behaviors, from beginning to end.

In addition, as discussed in more detail above, using the embodiments described above, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description may present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computer systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "creating" or "copying" or "emulating" or "executing" or "saving" or the like, refer to the action and processes of a computer system or similar electronic device that manipulates and operates on data represented as physical (electronic)

quantities within the computer system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus for performing the operations described herein. This apparatus may be specifically constructed for the required purposes, or the apparatus can comprise a general purpose system selectively activated or configured/reconfigured by a computer program stored on a computer program product as defined herein that can be accessed by a computer system or other device.

As discussed above, herein, a computer program product comprises a medium configured to store or transport computer readable code. Some examples of computer program products are CD-ROM discs, DVDs, ROM cards, floppy discs, magnetic tapes, computer hard drives, servers on a network, signals transmitted over a network representing computer readable code and/or application specific integrated circuits (ASICs). This medium may belong to a computer system, such as a computer system including a single processor or a computer system utilizing multiple processors or processor cores. However, the medium also may be removed from the computer system.

For example, all, or part of, process for ambiguous-state support in virtual machine emulators 200, described above, may be stored in a memory that is physically located in a location different from a computer system utilizing, process for ambiguous-state support in virtual machine emulators 200 and the computer system's processor(s). The computer system's processor(s) can be coupled to the memory in a client-server system or, alternatively, via a connection to another computer via modems and analog lines, digital interfaces and a digital carrier line, or wireless or cellular connections.

In some embodiments, the computer system and/or server system running and/or utilizing and/or storing, all, or part of, process for ambiguous-state support in virtual machine emulators 200, described above, is a portable computer, a workstation, a two-way pager, a cellular telephone, a smart phone, a digital wireless telephone, a personal digital assistant, a server computer, an Internet appliance, or any other device that includes components that can execute all, or part of, process for ambiguous-state support in virtual machine emulators, described above, in accordance with at least one of the embodiments as described herein. Similarly, in another embodiment, process for ambiguous-state support in virtual machine emulators, described above, is implemented on and/or run and/or stored on a computer system and/or server system that is comprised of multiple different computers, wireless devices, cellular telephones, digital telephones, two-way pagers, or personal digital assistants, server computers, or any desired combination of these devices that are interconnected to perform the methods as described herein.

Those of skill in the art will readily recognize that the algorithms and/or operations presented herein are not inherently related to any particular computer system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a network, such as a LAN, WAN, or the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

Those of skill in the art will readily recognize that the particular operations, and the order of performing those operations, shown above for process for ambiguous-state support in virtual machine emulators 200, were chosen for illustrative purposes only and that process for ambiguous-state support in virtual machine emulators 200 can be implemented with a lesser number or greater number of operations in a given embodiment, and that those operations can be performed in any logical order desired, based on the needs of the end-user.

In addition, the operations shown in the FIG.s for process for ambiguous-state support in virtual machine emulators 200 and discussed above are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer implemented method for ambiguous-state support in virtual machine emulators comprising:
   providing a first emulation model, the first emulation model being a baseline emulation model emulating baseline behaviors of two or more versions of a given computer component;
   executing a suspect application within the first emulation model;
   detecting a first version variable behavior of the suspect application, the first version variable behavior of the suspect application being associated with a first version of the two or more versions of the given computer system component, the first version variable behavior of the suspect application being detected at a point of first version variable behavior detection within the first emulation model;
   copying state data indicating the state of the first emulation model at the point of first version variable behavior detection;
   continuing to execute the suspect application within the first emulation model from the point of first version variable behavior detection;

providing a second emulation model the second emulation model being an emulation model emulating behaviors of the second version of the two or more versions of the given computer component, and;

executing the suspect application within the second emulation model from the point of first version variable behavior detection.

2. The computer implemented method for ambiguous-state support in virtual machine emulators of claim 1, wherein:

the given computer system component is a given processor associated with a computer system; and the first emulation model is an emulation model emulating baseline behaviors of two or more versions of the given processor model; and the first version variable behavior of the suspect application indicates a second version of the given processor, further wherein;

the second emulation model is an emulation model emulating behaviors of the second version of the two or more versions of the given processor.

3. The computer implemented method for ambiguous-state support in virtual machine emulators of claim 1, wherein:

the given computer system component is a given operating system associated with a computer system; and the first emulation model is an emulation model emulating baseline behaviors of two or more versions of the given operating system; and the first version variable behavior of the suspect application indicates a second version of the given operating system, further wherein;

the second emulation model is an emulation model emulating behaviors of the second version of the two or more versions of the given operating system.

4. The computer implemented method for ambiguous-state support in virtual machine emulators of claim 1, wherein:

the given computer system component is a given patch associated with a computer system; and the first emulation model is an emulation model emulating baseline behaviors of two or more versions of the given patch; and the first version variable behavior of the suspect application indicates a second version of the given patch, further wherein;

the second emulation model is an emulation model emulating behaviors of the second version of the two or more versions of the patch.

5. The computer implemented method for ambiguous-state support in virtual machine emulators of claim 1, wherein:

the given computer system component is a given memory associated with a computer system; and the first emulation model is an emulation model emulating baseline behaviors of two or more versions of the given memory; and the first version variable behavior of the suspect application indicates a second version of the given memory, further wherein;

the second emulation model is an emulation model emulating behaviors of the second version of the two or more versions of the given memory.

6. The computer implemented method for ambiguous-state support in virtual machine emulators of claim 1, further comprising:

detecting a second version variable behavior of the suspect application, the second version variable behavior of the suspect application being associated with a third version of the two or more versions of the given computer system component, the second version variable behavior of the suspect application being detected at a point of second version variable behavior detection within the first emulation model;

copying state data indicating the state of the first emulation model at the point of second version variable behavior detection;

continuing to execute the suspect application within the first emulation model from the point of second version variable behavior detection;

providing a third emulation model the third emulation model being an emulation model emulating behaviors of the third version of the two or more versions of the given computer component;

executing the suspect application within the third emulation model from the point of second version variable behavior detection.

7. The computer implemented method for ambiguous-state support in virtual machine emulators of claim 6, wherein:

the given computer system component is a given processor associated with a computer system; and the first emulation model is an emulation model emulating baseline behaviors of two or more versions of the given processor; and the first version variable behavior of the suspect application indicates a second version of the given processor, further wherein;

the second emulation model is an emulation model emulating behaviors of the second version of the two or more versions of the given processor and the second version variable behavior of the suspect application indicates a third version of the given processor, further wherein;

the third emulation model is an emulation model emulating behaviors of the third version of the two or more versions of the given processor.

8. The computer implemented method for ambiguous-state support in virtual machine emulators of claim 6, wherein:

the given computer system component is a given operating system associated with a computer system; and the first emulation model is an emulation model emulating baseline behaviors of two or more versions of the given operating system; and the first version variable behavior of the suspect application indicates a second version of the given operating system, further wherein;

the second emulation model is an emulation model emulating behaviors of the second version of the two or more versions of the given operating system and the second version variable behavior of the suspect application indicates a third version of the given operating system, further wherein;

the third emulation model is an emulation model emulating behaviors of the third version of the two or more versions of the operating system.

9. The computer implemented method for ambiguous-state support in virtual machine emulators of claim 6, wherein:

the given computer system component is a given patch associated with a computer system; and the first emulation model is an emulation model emulating baseline behaviors of two or more versions of the given patch; and the first version variable behavior of the suspect application indicates a second version of the given patch, further wherein;

the second emulation model is an emulation model emulating behaviors of the second version of the two or more versions of the given patch and the second version variable behavior of the suspect application indicates a third version of the given patch, further wherein;

the third emulation model is an emulation model emulating behaviors of the third version of the two or more versions of the given patch.

10. The computer implemented method for ambiguous-state support in virtual machine emulators of claim 6, wherein:
the given computer system component is a given memory associated with a computer system; and
the first emulation model is an emulation model emulating baseline behaviors of two or more versions of the given memory; and the first version variable behavior of the suspect application indicates a second version of the given memory, further wherein;
the second emulation model is an emulation model emulating behaviors of the second version of the two or more versions of the given memory and the second version variable behavior of the suspect application indicates a third version of the given memory, further wherein;
the third emulation model is an emulation model emulating behaviors of the third version of the two or more versions of the given memory.

11. The computer implemented method for ambiguous-state support in virtual machine emulators of claim 6, further comprising:
detecting a third version variable behavior of the suspect application, the third version variable behavior of the suspect application being associated with a fourth version of the two or more versions of the given computer system component, the third version variable behavior of the suspect application being detected at a point of third version variable behavior detection within the second emulation model;
copying state data indicating the state of the second emulation model at the point of third version variable behavior detection;
continuing to execute the suspect application within the second emulation model from the point of third version variable behavior detection;
providing a fourth emulation model; the fourth emulation model being an emulation model emulating behaviors of a fourth version of the two or more versions of the given computer component;
executing the suspect application within the fourth emulation model from the point of third version variable behavior detection.

12. The computer implemented method for ambiguous-state support in virtual machine emulators of claim 11, wherein:
the given computer system component is a given processor associated with a computer system; and
the first emulation model is an emulation model emulating baseline behaviors of two or more versions of the given processor; and the first version variable behavior of the suspect application indicates a second version of the given processor, further wherein;
the second emulation model is an emulation model emulating behaviors of the second version of the two or more versions of the given processor and the second version variable behavior of the suspect application indicates a third version of the given processor, further wherein;
the third emulation model is an emulation model emulating behaviors of the third version of the two or more versions of the processor and the third version variable behavior of the suspect application indicates a fourth version of the given processor, further wherein;
the fourth emulation model is an emulation model emulating behaviors of the fourth version of the two or more versions of the given processor.

13. The computer implemented method for ambiguous-state support in virtual machine emulators of claim 11, wherein:
the given computer system component is a given operating system associated with a computer system; and
the first emulation model is an emulation model emulating baseline behaviors of two or more versions of the given operating system; and the first version variable behavior of the suspect application indicates a second version of the given operating system, further wherein;
the second emulation model is an emulation model emulating behaviors of the second version of the two or more versions of the operating system and the second version variable behavior of the suspect application indicates a third version of the given operating system, further wherein;
the third emulation model is an emulation model emulating behaviors of the third version of the two or more versions of the given operating system and the third version variable behavior of the suspect application indicates a fourth version of the given operating system, further wherein;
the fourth emulation model is an emulation model emulating behaviors of the fourth version of the two or more versions of the operating system.

14. The computer implemented method for ambiguous-state support in virtual machine emulators of claim 11, wherein:
the given computer system component is a given patch associated with a computer system; and
the first emulation model is an emulation model emulating baseline behaviors of two or more versions of the given patch; and the first version variable behavior of the suspect application indicates a second version of the given patch, further wherein;
the second emulation model is an emulation model emulating behaviors of the second version of the two or more versions of the given patch and the second version variable behavior of the suspect application indicates a third version of the given patch, further wherein;
the third emulation model is an emulation model emulating behaviors of the third version of the two or more versions of the given patch and the third version variable behavior of the suspect application indicates a fourth version of the given patch, further wherein;
the fourth emulation model is an emulation model emulating behaviors of the fourth version of the two or more versions of the given patch.

15. The computer implemented method for ambiguous-state support in virtual machine emulators of claim 11, wherein:
the given computer system component is a given memory associated with a computer system; and
the first emulation model is an emulation model emulating baseline behaviors of two or more versions of the given memory; and the first version variable behavior of the suspect application indicates a second version of the given memory, further wherein;
the second emulation model is an emulation model emulating behaviors of the second version of the two or more versions of the given memory and the second version variable behavior of the suspect application indicates a third version of the given memory, further wherein;
the third emulation model is an emulation model emulating behaviors of the third version of the two or more versions of the given memory and the third version variable behavior of the suspect application indicates a fourth version of the given memory, further wherein;

the fourth emulation model is an emulation model emulating behaviors of the fourth version of the two or more versions of the given memory.

16. A system for providing ambiguous-state support in virtual machine emulators comprising:

a memory having stored therein a process for ambiguous-state support in virtual machine emulators application; and a processor coupled to the memory, wherein execution of the process for ambiguous-state support in virtual machine emulators application generates a method comprising:

providing a first emulation model, the first emulation model being a baseline emulation model emulating baseline behaviors of two or more versions of a given computer component;

executing a suspect application within the first emulation model;

detecting a first version variable behavior of the suspect application, the first version variable behavior of the suspect application being associated with a first version of the two or more versions of the given computer system component, the first version variable behavior of the suspect application being detected at a point of first version variable behavior detection within the first emulation model;

copying state data indicating the state of the first emulation model at the point of first version variable behavior detection;

continuing to execute the suspect application within the first emulation model from the point of first version variable behavior detection;

providing a second emulation model, the second emulation model being an emulation model emulating behaviors of the second version of the two or more versions of the given computer component, and;

executing the suspect application within the second emulation model from the point of first version variable behavior detection.

17. The system for providing ambiguous-state support in virtual machine emulators of claim 16, wherein:

the given computer system component is a given processor associated with a computer system; and the first emulation model is an emulation model emulating baseline behaviors of two or more versions of the given processor model; and the first version variable behavior of the suspect application indicates a second version of the given processor, further wherein;

the second emulation model is an emulation model emulating behaviors of the second version of the two or more versions of the given processor.

18. The system for providing ambiguous-state support in virtual machine emulators of claim 16, wherein:

the given computer system component is a given operating system associated with a computer system; and the first emulation model is an emulation model emulating baseline behaviors of two or more versions of the given operating system; and the first version variable behavior of the suspect application indicates a second version of the given operating system, further wherein;

the second emulation model is an emulation model emulating behaviors of the second version of the two or more versions of the given operating system.

19. The system for providing ambiguous-state support in virtual machine emulators of claim 16, wherein:

the given computer system component is a given patch associated with a computer system; and the first emulation model is an emulation model emulating baseline behaviors of two or more versions of the given patch; and the first version variable behavior of the suspect application indicates a second patch version of the given patch, further wherein;

the second emulation model is an emulation model emulating behaviors of the second version of the two or more versions of the patch.

20. The system for providing ambiguous-state support in virtual machine emulators of claim 16, wherein:

the given computer system component is a given memory associated with a computer system; and the first emulation model is an emulation model emulating baseline behaviors of two or more versions of the given memory; and the first version variable behavior of the suspect application indicates a second version of the given memory, further wherein;

the second emulation model is an emulation model emulating behaviors of the second version of the two or more versions of the given memory.

* * * * *

UNITED STATES PATENT AND TRADEMARK OFFICE
CERTIFICATE OF CORRECTION

PATENT NO. : 7,664,626 B1 Page 1 of 1
APPLICATION NO. : 11/389629
DATED : February 16, 2010
INVENTOR(S) : Peter Ferrie It is certified that error appears in the above-identified patent and that said Letters Patent is hereby corrected as shown below:

In Column 44, Line 28, Claim 19, between "second" and "version", delete "patch".

Signed and Sealed this

Twenty-seventh Day of April, 2010

David J. Kappos
*Director of the United States Patent and Trademark Office*